(12) United States Patent
Ajito

(10) Patent No.: US 9,906,741 B2
(45) Date of Patent: Feb. 27, 2018

(54) IMAGING APPARATUS, IMAGING SYSTEM, AND IMAGE PROCESSING METHOD

(71) Applicant: Olympus Corporation, Shibuya-ku, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 175 days.

(21) Appl. No.: 15/051,818

(22) Filed: Feb. 24, 2016

(65) Prior Publication Data

US 2016/0173792 A1    Jun. 16, 2016

Related U.S. Application Data

(63) Continuation of application No. PCT/JP2014/072017, filed on Aug. 22, 2014.

(30) Foreign Application Priority Data

Aug. 27, 2013  (JP) .................. 2013-176099

(51) Int. Cl.
*H04N 5/357*     (2011.01)
*H04N 5/217*     (2011.01)
(Continued)

(52) U.S. Cl.
CPC ............ *H04N 5/3572* (2013.01); *G02B 7/10* (2013.01); *G03B 17/14* (2013.01); *H04N 5/2176* (2013.01);
(Continued)

(58) Field of Classification Search
None
See application file for complete search history.

(56) References Cited

U.S. PATENT DOCUMENTS

2002/0135688 A1    9/2002  Niikawa
2005/0206966 A1    9/2005  Kakumitsu
(Continued)

FOREIGN PATENT DOCUMENTS

JP    2003-333422    11/2003
JP    2006-295807    10/2006
(Continued)

OTHER PUBLICATIONS

International Search Report to International Application No. PCT/JP2014/072017, dated Nov. 18, 2014 (3 pgs.) with translation (1 pg.).

(Continued)

*Primary Examiner* — Roberto Velez
*Assistant Examiner* — Yih-Sien Kao
(74) *Attorney, Agent, or Firm* — John C. Pokotylo; Pokotylo Patent Services

(57) ABSTRACT

An imaging apparatus includes an optical system, a data storage unit, an imaging unit, and an image processing unit. The optical system is variable in focal distance and varies a size of an image circle by the focal distance. A data storage unit stores data indicating a correspondence between a value of the focal distance and a value of the size of the image circle. The imaging unit obtains image data from the optical image. The image processing unit performs composition processing of image data in multiple frames after dividing each of the image data in multiple frames corresponding to an outside of the image circle into quadrant-by-quadrant regions and aligning the divided image data in multiple frames quadrant by quadrant.

12 Claims, 19 Drawing Sheets

(51) Int. Cl.
　　　*G02B 7/10*　　　(2006.01)
　　　*G03B 17/14*　　 (2006.01)
　　　*H04N 5/225*　　(2006.01)
　　　*H04N 5/262*　　(2006.01)
　　　*G03B 13/32*　　(2006.01)
　　　*H04N 5/235*　　(2006.01)

(52) U.S. Cl.
　　　CPC ......... *H04N 5/2254* (2013.01); *H04N 5/2621* (2013.01); *H04N 5/2628* (2013.01); *G03B 13/32* (2013.01); *H04N 5/2353* (2013.01)

(56) References Cited

U.S. PATENT DOCUMENTS

| 2006/0244848 | A1 | 11/2006 | Hori |
| 2012/0081594 | A1 | 4/2012 | Makigaki |

FOREIGN PATENT DOCUMENTS

| JP | 2007-159037 | 6/2007 |
| JP | 2010-239267 | 10/2010 |
| JP | 2012-068733 | 4/2012 |
| JP | 2012-078425 | 4/2012 |
| JP | 2013-042424 | 2/2013 |

OTHER PUBLICATIONS

Translation of International Preliminary Report on Patentability and Written Opinion of the International Searching Authority to International Application No. PCT/JP2014/072017, dated Mar. 10, 2016 (10 pgs.).

First Office Action to corresponding Japanese Patent Application Serial No. 2013-176099, dated Jun. 13, 2017 (4 pgs.), with translation (3 pgs.).

Supplementary European Search Report to counterpart European Application No. 14838937.2, dated Mar. 8, 2017 (10 pgs.).

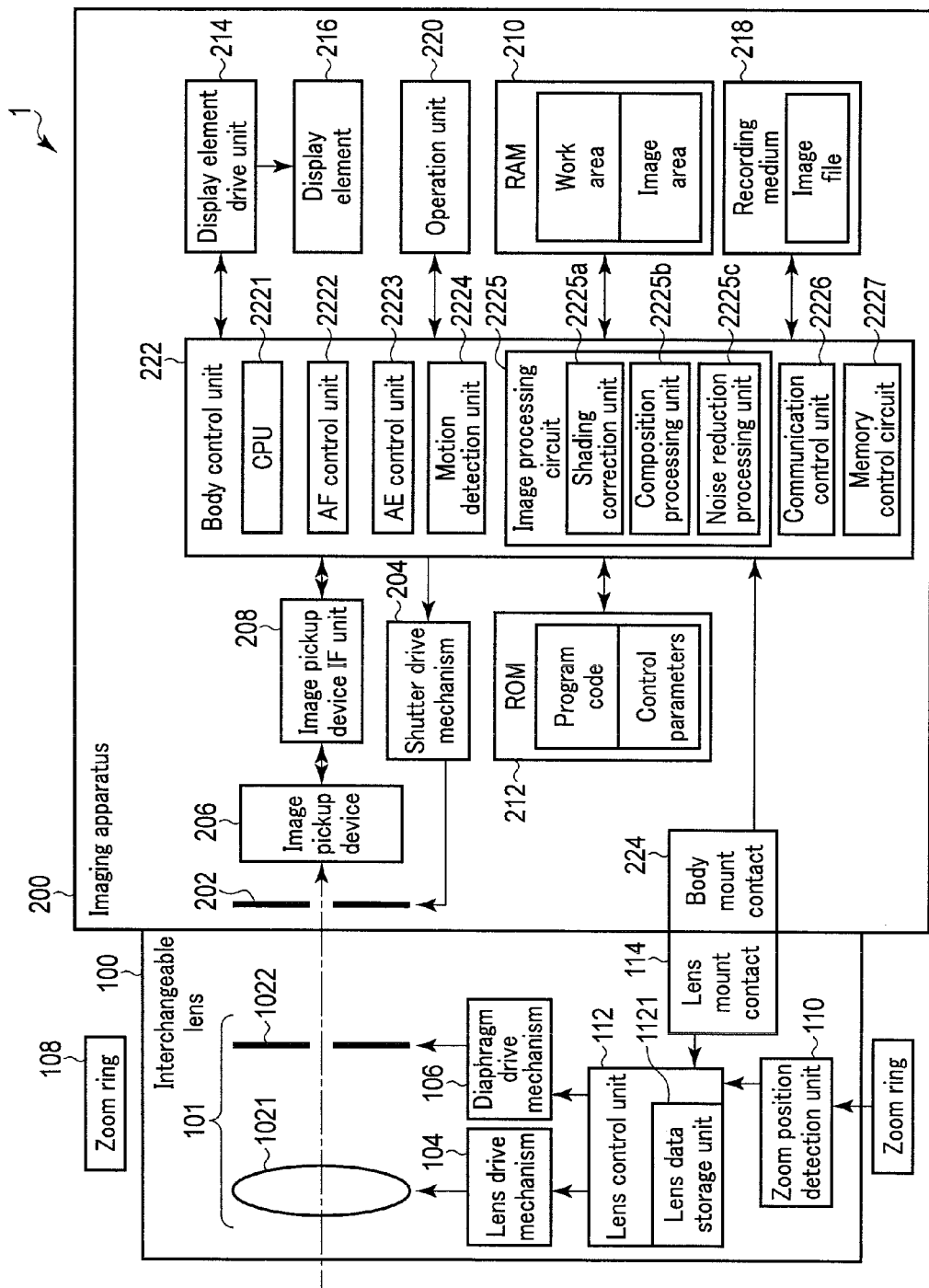
F I G. 1

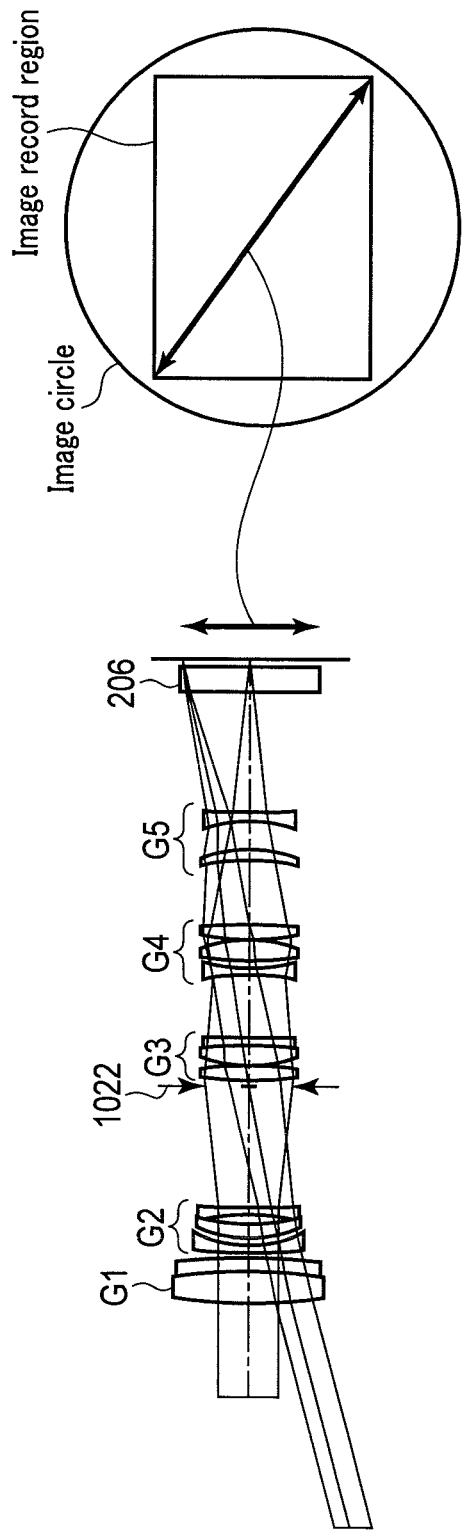

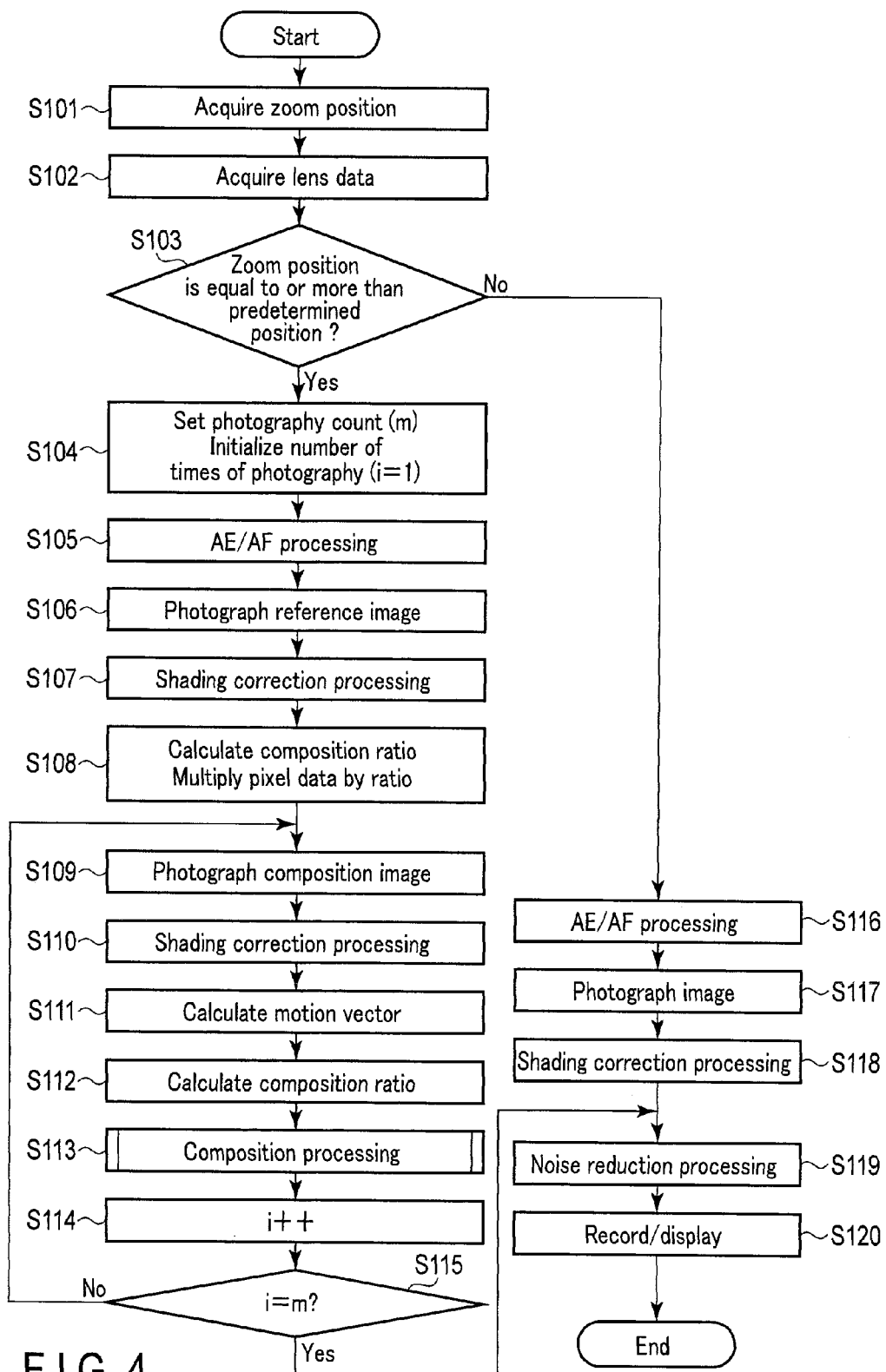
F I G. 4

| Shading characteristic condition | Photography count |
|---|---|
| $1 < \alpha/\beta \leq \sqrt{2}$ | 2 |
| $\sqrt{2} < \alpha/\beta \leq \sqrt{3}$ | 3 |
| $\sqrt{3} < \alpha/\beta \leq 2$ | 4 |

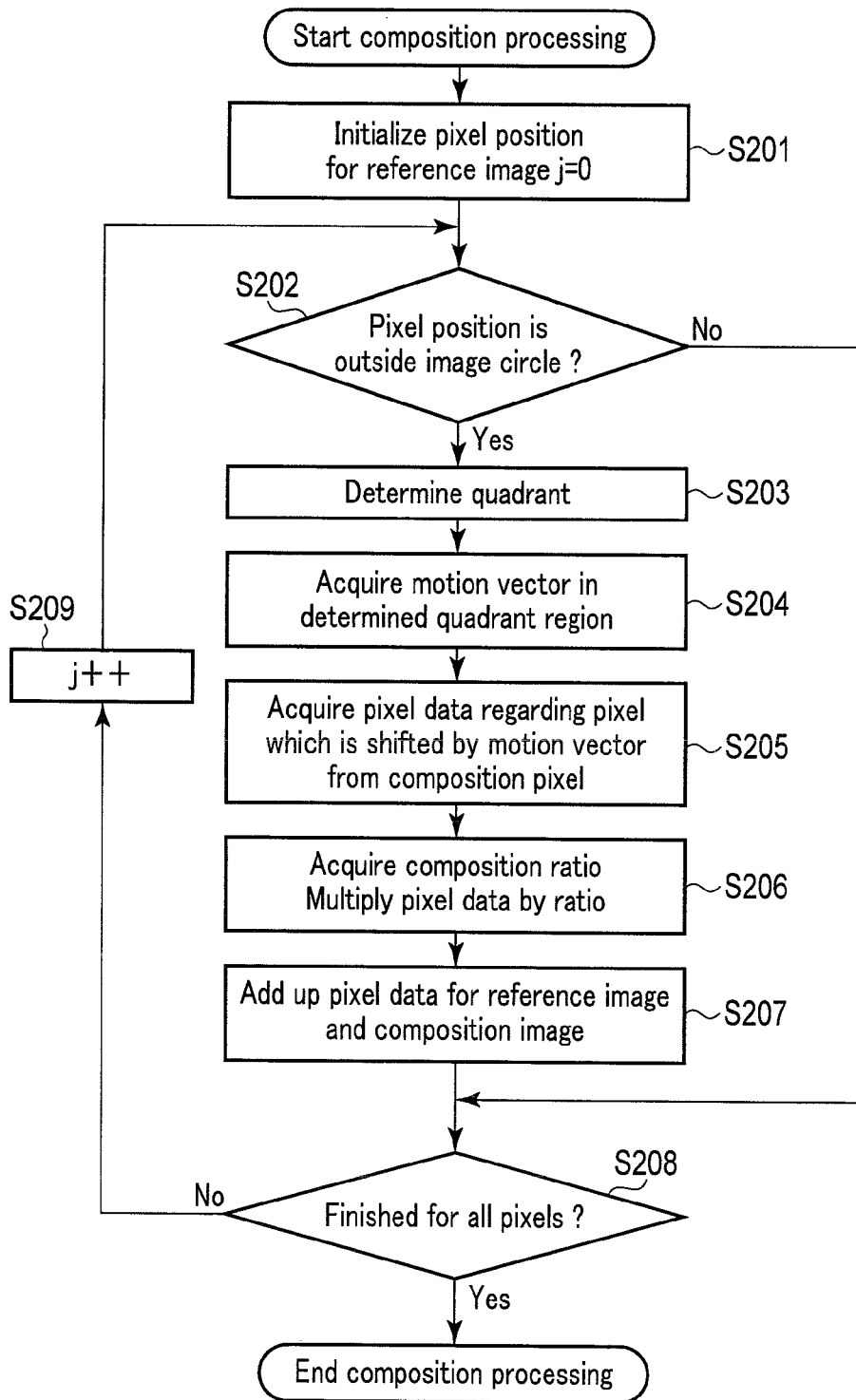
F I G. 8

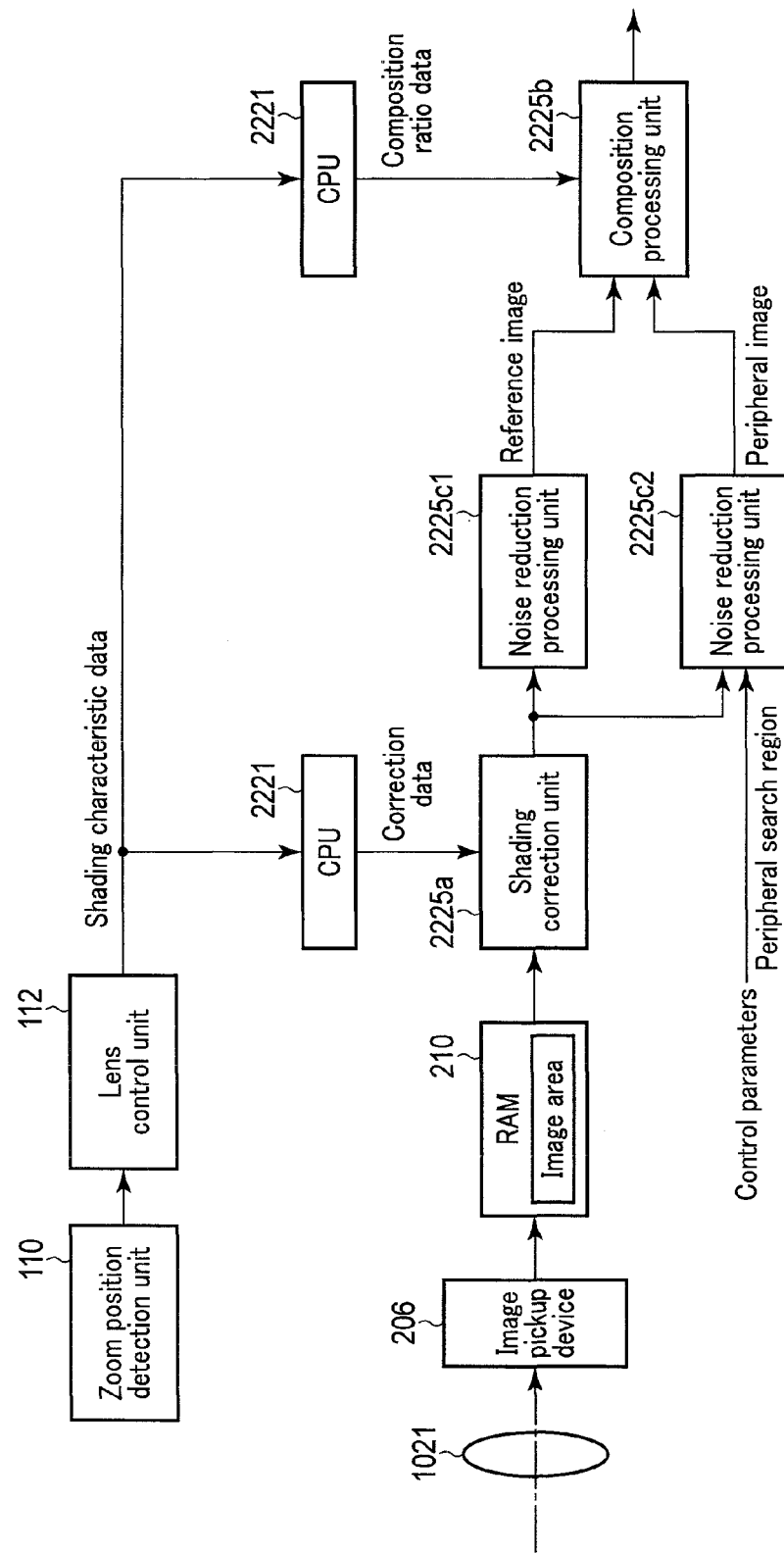
F I G. 13

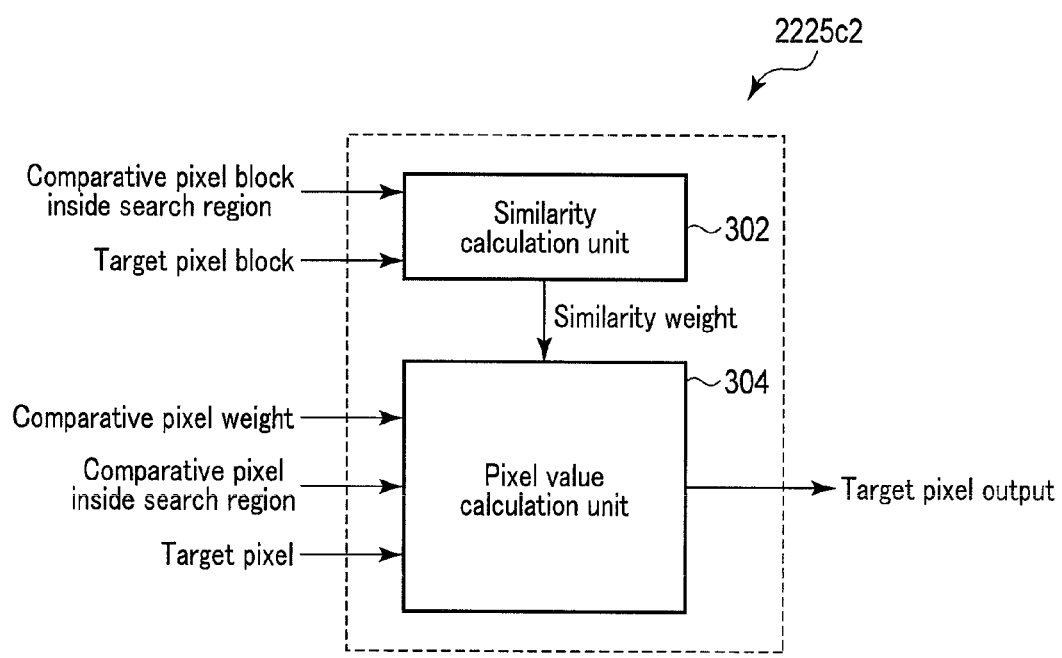
F I G. 14

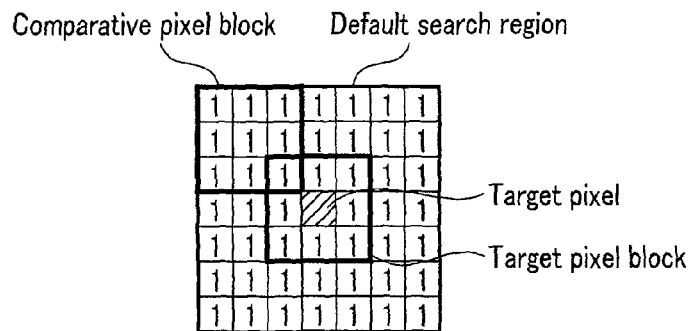
F I G. 15A
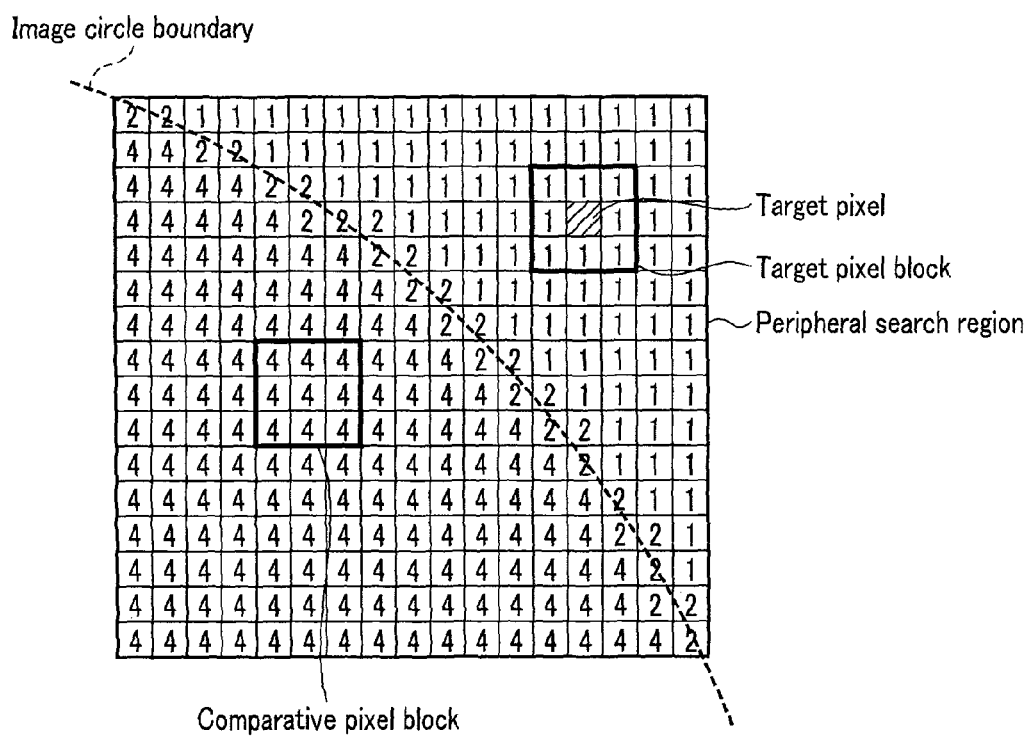
F I G. 15B

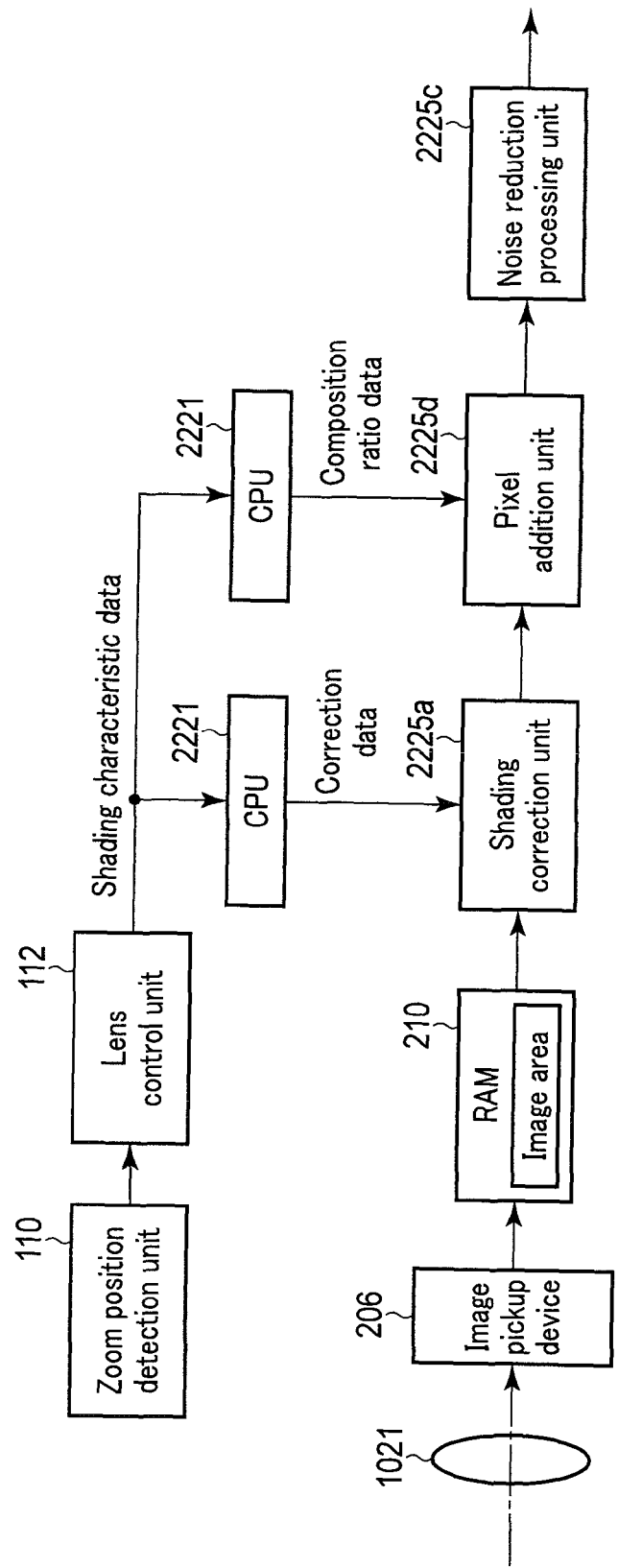
F I G. 16

IMAGING APPARATUS, IMAGING SYSTEM, AND IMAGE PROCESSING METHOD

CROSS-REFERENCE TO RELATED APPLICATIONS

This application is a Continuation application of PCT Application No. PCT/JP2014/072017, filed Aug. 22, 2014 and based upon and claiming the benefit of priority from the prior Japanese Patent Application No. 2013-176099, filed Aug. 27, 2013, the entire contents of both of which are incorporated herein by reference.

BACKGROUND OF THE INVENTION

1. Field of the Invention

The present invention relates to an imaging apparatus, an imaging system, and an image processing method.

2. Description of the Related Art

In a general imaging apparatus, an optical image of a subject is formed on an image pickup device via an optical system. In such an imaging apparatus, the light amount of the optical image formed on the image pickup device becomes smaller in parts closer to the periphery of the image pickup device because of the characteristics of the optical system. Moreover, in such an imaging apparatus, the optical image is more distorted in parts closer to the periphery of the image pickup device. Heretofore, a shading correction has been performed to correct the decrease of the light amount in the peripheral parts of the image pickup device, and a distortion correction has been performed to correct the distortion of the optical image resulting from the characteristics of the optical system.

Here, when the image deterioration is corrected by use of the shading correction or the distortion correction, the S/N characteristics may vary between the center and periphery of the image. In contrast, Jpn. Pat. Appln. KOKAI Publication No. 2006-295807 suggests the suppression of the variation of the S/N characteristics between the center and periphery of the image by controlling the suppression level of noise reduction in accordance with a correction amount used in, for example, the shading correction.

BRIEF SUMMARY OF THE INVENTION

According to a first aspect of the invention, an imaging apparatus comprises: an optical system which is variable in focal distance and which varies a size of an image circle by the focal distance, the image circle being an effective image formation region of an optical image of a subject; a data storage unit which stores data indicating a correspondence between a value of the focal distance and a value of the size of the image circle; an imaging unit which obtains image data from the optical image formed on an image pickup device via the optical system; and an image processing unit which performs image processing for image data corresponding to an outside of the image circle among image data obtained in the imaging unit on the basis of the data indicating the correspondence, wherein as the image processing for the image data corresponding to the outside of the image circle, the image processing unit performs composition processing of image data in multiple frames after dividing each of the image data in multiple frames corresponding to the outside of the image circle into quadrant-by-quadrant regions and aligning the divided image data in multiple frames quadrant by quadrant.

According to a second aspect of the invention, an imaging system comprising: an interchangeable lens comprising an optical system which is variable in focal distance and which varies a size of an image circle by the focal distance, the image circle being an effective image formation region of an optical image of a subject, a lens data storage unit which stores data indicating a correspondence between a value of the focal distance and a value of the size of the image circle, and a lens interface unit which sends data indicating the correspondence; and an imaging apparatus comprising an imaging unit which obtains image data from the optical image formed on an image pickup device via the optical system, an apparatus interface unit which receives the data indicating the correspondence from the lens interface unit, and an image processing unit which performs image processing for image data corresponding to an outside of the image circle among image data obtained in the imaging unit on the basis of the data indicating the correspondence received in the apparatus interface unit, wherein as the image processing for the image data corresponding to the outside of the image circle, the image processing unit performs composition processing of image data in multiple frames after dividing each of the image data in multiple frames corresponding to the outside of the image circle into quadrant-by-quadrant regions and aligning the divided image data in multiple frames quadrant by quadrant.

According to a third aspect of the invention, an image processing method comprising: obtaining image data from an optical image formed in an imaging unit via an optical system, the optical system being variable in focal distance and varying a size of an image circle by the focal distance, the image circle being an effective image formation region of the optical image of a subject; and performing image processing for image data corresponding to an outside of the image circle among image data obtained in the imaging unit on the basis of the data indicating a correspondence between a value of the focal distance and a value of a size of the image circle, wherein the image processing for the image data corresponding to the outside of the image circle comprises performing composition processing of image data in multiple frames, the composition processing being performed after dividing each of the image data in multiple frames corresponding to the outside of the image circle into quadrant-by-quadrant regions and aligning the divided image data in multiple frames quadrant by quadrant.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 is a diagram showing the overall configuration of an imaging system according to each embodiment of the present invention;

FIG. 2A is a diagram showing the configuration of an example of an optical system, and showing the optical system in which the focal distance corresponds to a wide end;

FIG. 4 is a flowchart showing a detailed operation of the imaging system according to the first embodiment of the present invention;

FIG. 8 is a flowchart showing composition processing;

FIG. 13 is a functional block diagram showing the flow of data processing according to the third embodiment of the present invention;

FIG. 14 is a diagram showing the configuration of a noise reduction processing unit 2225c2;

FIG. 15A is a diagram showing a search region and comparative pixel weights in the case in which a target pixel is inside an image circle;

FIG. 15B is a diagram showing a search region and comparative pixel weights in the case in which the target pixel is outside the image circle;

FIG. 16 is a functional block diagram showing the flow of data processing according to the fourth embodiment of the present invention;

DETAILED DESCRIPTION OF THE INVENTION

Figure 2B:
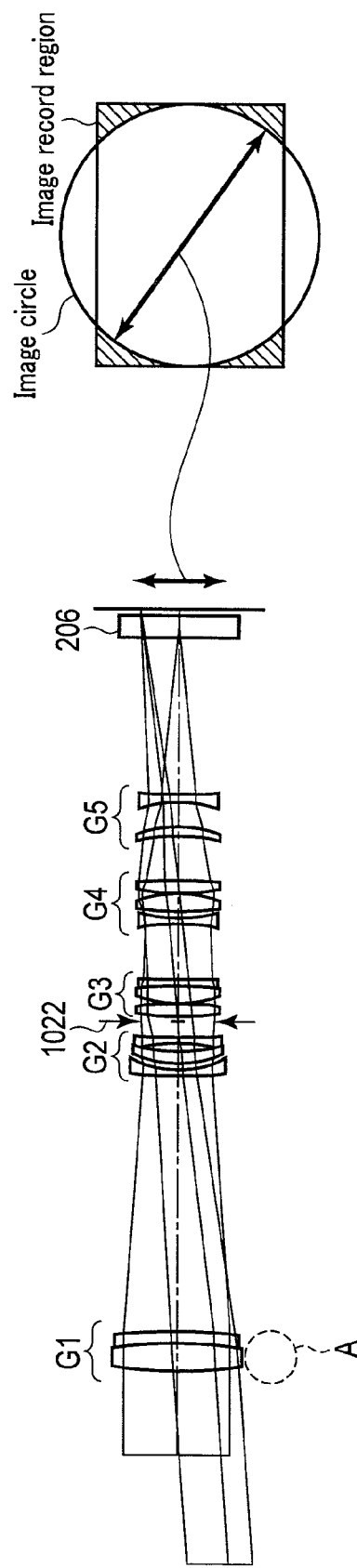
FIG. 2B is a diagram showing the configuration of an example of an optical system, and showing the optical system in which the focal distance corresponds to a tele end.

Hereinafter, embodiments of the present invention will be described with reference to the drawings.

First Embodiment

Initially, the first embodiment of the present invention is described. FIG. 1 is a diagram showing the overall configuration of an imaging system according to each embodiments of the present invention. An imaging system 1 shown in FIG. 1 includes an interchangeable lens 100 and an imaging apparatus 200. The interchangeable lens 100 is configured to be attached to and detached from the imaging apparatus 200. When the interchangeable lens 100 is attached to the imaging apparatus 200, the interchangeable lens 100 is connected to the imaging apparatus 200 in communication with each other. As a result, the interchangeable lens 100 is operable under the control of the imaging apparatus 200.

The interchangeable lens 100 includes an optical system 101, a lens drive mechanism 104, a diaphragm drive mechanism 106, a zoom ring 108, a zoom position detection unit 110, a lens control unit 112, and a lens mount contact 114.

The optical system 101 is an optical system for forming a light ray from an unshown subject into an image on an imaging surface of an image pickup device 206. The optical system 101 includes a photography lens 1021 and a diaphragm 1022. The photography lens 1021 includes one or more lenses which are variable in focal distance and which are designed to vary the size of an image circle in accordance with the change of the focal distance. Specifically, the photography lens 1021 in the example according to the present embodiment is designed to be driven along an optical axis direction indicated by a dashed line in FIG. 1 to change its focal distance so that the image circle may be reduced in size as the focal distance becomes longer. The diaphragm 1022 is configured to open and close, and adjusts the amount of the light ray entering the image pickup device 206 via the photography lens 1021. Details of the optical system 101 will be described later.

The lens drive mechanism 104 includes a motor and its drive circuit or the like. Under the control of the lens control unit 112, the lens drive mechanism 104 drives the photography lens 1021 in its optical axis direction. The diaphragm drive mechanism 106 includes a drive mechanism for driving the diaphragm 1022. The diaphragm drive mechanism 106 drives the diaphragm 1022 under the control of the lens control unit 112.

The zoom ring 108 is an operation member provided rotatably along the outer circumference of the body of the interchangeable lens 100. The zoom position detection unit 110 is, for example, an encoder configured to detect the operation amount of the zoom ring 108. This zoom position detection unit 110 inputs the operation amount of the zoom ring 108 to the lens control unit 112 as information regarding the focal distance (zoom position) of the photography lens 1021. Here, for example, a higher value of the zoom position means a greater focal distance of the photography lens 1021.

The lens control unit 112 is connected to a body control unit 222 of the imaging apparatus 200 in communication with each other via the lens mount contact 114 and a body mount contact 224. This lens control unit 112 controls the lens drive mechanism 104 and the diaphragm drive mechanism 106 in accordance with the input from the body control unit 222 and the input from the zoom position detection unit 110. The lens control unit 112 includes a lens data storage unit 1121 which is, for example, a flash memory. The lens data storage unit 1121 stores lens data regarding, for example, aberration characteristics of the optical system 101. The lens data storage unit 1121 according to the present embodiment stores, as shading characteristic data, data regarding light amount decrease amount associated with image height based on the center of the optical axis. The lens data storage unit 1121 stores the shading characteristic data for each value of the focal distance (zoom position) of the photography lens 1021. This is because the optical system 101 is an optical system configured to vary the size of the image circle in accordance with the focal distance.

The lens mount contact 114 is a contact provided in a mount portion of the interchangeable lens 100. The lens mount contact 114 is electrically connected to the body mount contact 224 when the interchangeable lens 100 is attached to the imaging apparatus 200, and the lens mount contact 114 functions as a lens interface unit for the communication between the interchangeable lens 100 and the imaging apparatus 200.

The imaging apparatus 200 includes a shutter 202, a shutter drive mechanism 204, the image pickup device 206, an image pickup device interface (IF) unit 208, a RAM 210, a ROM 212, a display element drive unit 214, a display element 216, a recording medium 218, an operation unit 220, the body control unit 222, and the body mount contact 224.

The shutter 202 is configured so that the imaging surface of the image pickup device 206 is shielded from or exposed to light. The exposure time of the image pickup device 206 is adjusted by the control of the shutter speed of the shutter 202. The shutter drive mechanism 204 includes a drive mechanism for driving the shutter 202, and drives the shutter 202 under the control of the body control unit 222.

The image pickup device 206 includes the imaging surface on which the light ray from the subject collected via the optical system 101 is formed into an image. Pixels are two-dimensionally arranged in the imaging surface of the image pickup device 206. A color filter is provided on the light entrance side of the imaging surface. This image pickup device 206 converts an optical image (subject image) corresponding to the light ray formed into the image on the imaging surface into an electric signal (hereinafter referred to as an image signal) corresponding to its light amount. The image pickup device IF unit 208 which functions as an imaging unit together with the image pickup device 206 inputs imaging control information to the image pickup device 206 to drive the image pickup device 206 under the control of a CPU 2221 of the body control unit 222. The image pickup device IF unit 208 reads the image signal obtained by the image pickup device 206 under the control of the body control unit 222, and subjects the read image signal to analog processing such as correlated double sampling (CDS) processing and automatic gain control (AGC) processing. The image pickup device IF unit 208 further converts the analog-processed image signal into a digital signal (hereinafter referred to as image data).

The RAM 210 is, for example, an SDRAM, and has a work area and an image area as storage areas. The work area is the storage area provided in the RAM 210 to temporarily store various calculation data generated in each of the units in the imaging apparatus 200. The image area is the storage area provided in the RAM 210 to temporarily store the image data obtained by the image pickup device IF unit 208 and the image data generated in each of the units in the imaging apparatus 200 such as image data being processed.

The ROM 212 is, for example, a flash memory, and stores a program code for the CPU 2221 of the body control unit 222 to perform various processing. The ROM 212 also stores various control parameters; for example, a control parameter necessary for the operation of the image pickup device 206, and a control parameter necessary for the image processing in an image processing unit 2225 of the body control unit 222.

The display element drive unit 214 drives the display element 216 on the basis of the image data input from the body control unit 222, and displays an image on the display element 216. The display element 216 is, for example, a liquid crystal display or an organic EL display, and displays various images such as images for live views and images recorded in the recording medium 218.

The recording medium 218 is, for example, a memory card. An image file obtained by a photography operation is recorded in the recording medium 218. The image file is a file having a configuration in which a given header is attached to the image data. For example, data indicating an exposure condition is stored in the header as tag data.

The operation unit 220 includes operation members for a user to perform various operations of the imaging apparatus 200. The operation members include, for example, a release button, a menu button, and a power button. The release button is an operation member for the user to instruct the imaging apparatus 200 to start still image photography. When this release button is pressed halfway, instructions for automatic exposure (AE) processing and automatic focus (AF) processing are given to the body control unit 222. When the release button is fully pressed, an instruction for a photography (still image recording) operation is given to the body control unit 222. The menu button is an operation member for issuing an instruction to display a menu screen for setting various modes of the imaging apparatus 200. The user can perform various settings regarding the imaging apparatus 200 on the menu screen. The various settings include setting of the number of pixels to be recorded which is the number of pixels in the image data to be recorded in, for example, the recording medium 218. The power button is an operation member for the user to instruct the imaging apparatus 200 to turn on or off power.

The body control unit 222 includes the CPU 2221, an AF control unit 2222, an AE control unit 2223, a motion detection unit 2224, the image processing unit 2225, a communication control unit 2226, and a memory control unit 2227, as control circuits for controlling the operation of the imaging apparatus 200. The CPU 2221 is a control unit for controlling the operation of each of the blocks outside the body control unit 222, for example, the shutter drive mechanism 204, the image pickup device IF unit 208, and the display element drive unit 214, the operation of the lens control unit 112, and the operation of each of the control circuits of the body control unit 222. The AF control unit 2222 controls AF processing. The AF processing is, for example, contrast AF processing. Specifically, the AF control unit 2222 extracts high-frequency components of the image data obtained in the image pickup device IF unit 208, adds up the extracted high-frequency components, and thereby acquires an in-focus evaluation value for AF for each AF area. The CPU 2221 evaluates the contrast of the image data in accordance with this in-focus evaluation value, and also controls the lens control unit 112 to bring the photography lens 1021 into focus. The AE control unit 2223 controls AE processing. Specifically, the AE control unit 2223 uses the image data obtained in the image pickup device IF unit 208 to calculate a subject luminance. The CPU 2221 calculates the aperture amount (aperture value) of the diaphragm 1022 during photography, a release time (shutter speed) of the shutter 202, and exposure conditions such as the sensitivity of the image pickup device 206 so that the above subject luminance will be a predetermined proper value. The motion detection unit 2224 detects a motion vector between image data in multiple frames quadrant by quadrant. The quadrants are set so that a position corresponding to the center of the optical axis in the image data is the original position. That is, the upper right region from the original position is the first quadrant, the upper left region from the original position is the second quadrant, the lower left region from the original position is the third quadrant, and the lower right region from the original position is the fourth quadrant. The image processing unit 2225 performs various image processing for the image data. The image processing unit 2225 according to the present embodiment includes a shading correction unit 2225a, a composition processing unit 2225b, and a noise reduction processing unit 2225c. The shading correction unit 2225a corrects, by, for example, gain multiplication, a light amount decrease in the peripheral part of the image data resulting from, for example, the characteristics of the photography lens 1021. The composition processing unit 2225b composes image data in multiple frames per image data. The noise reduction processing unit 2225c reduces noise in image data by, for example, coring processing. In addition to the shading correction unit processing, the composition processing, and the noise reduction processing, the image processing unit 2225 also performs color correction processing, gamma correction processing, distortion correction processing, and compression processing. The image processing unit 2225 also decompresses compressed image data. The communication control unit 2226 controls when, for example, the CPU 2221 of the body control unit 222 communicates with the lens control unit 112. The memory control unit 2227 controls when, for example, the CPU 2221 accesses the RAM 210, the ROM 212, and the recording medium 218.

The body mount contact 224 is a contact provided in the mount portion of the imaging apparatus 200. The body mount contact 224 is electrically connected to the lens mount contact 114 when the interchangeable lens 100 is attached to the imaging apparatus 200, and functions as an apparatus interface unit for the communication between the interchangeable lens 100 and the imaging apparatus 200.

FIG. 2A and FIG. 2B are diagrams showing the configuration of an example of the optical system 101. FIG. 2A shows a state in which the focal distance corresponds to a wide end. FIG. 2B shows a state in which the focal distance corresponds to a tele end. As shown in FIG. 2A and FIG. 2B, the photography lens 1021 in the optical system 101 includes five groups of lenses G1 to G5. The diaphragm 1022 is disposed in the optical paths of the five groups of lenses G1 to G5.

In such an example of the photography lens 1021, the focal distance is increased mainly when the first group lens G1 is let out to the subject side (the left side in the drawings). The other lens groups are used to mainly correct aberration and focus. Here, the aperture of the first group lens G1 corresponding to a front lens among the five groups of lenses G1 to G5 constituting the photography lens 1021 is smaller than the aperture of a normal front lens (a part of A in the drawing). Therefore, when the focal distance is short as in FIG. 2A, a record image region preset in the image pickup device 206 is received inside the image circle. However, when the focal distance is long as in FIG. 2B, the record image region in the image pickup device 206 is not received inside the image circle. The image data outside the image circle is greatly reduced in light amount, and cannot be normally used as the image data for recording or display. The image processing unit 2225 corrects such a light amount decrease by use of, for example, shading correction processing. Details of the correction will be described later.

Figure 3:
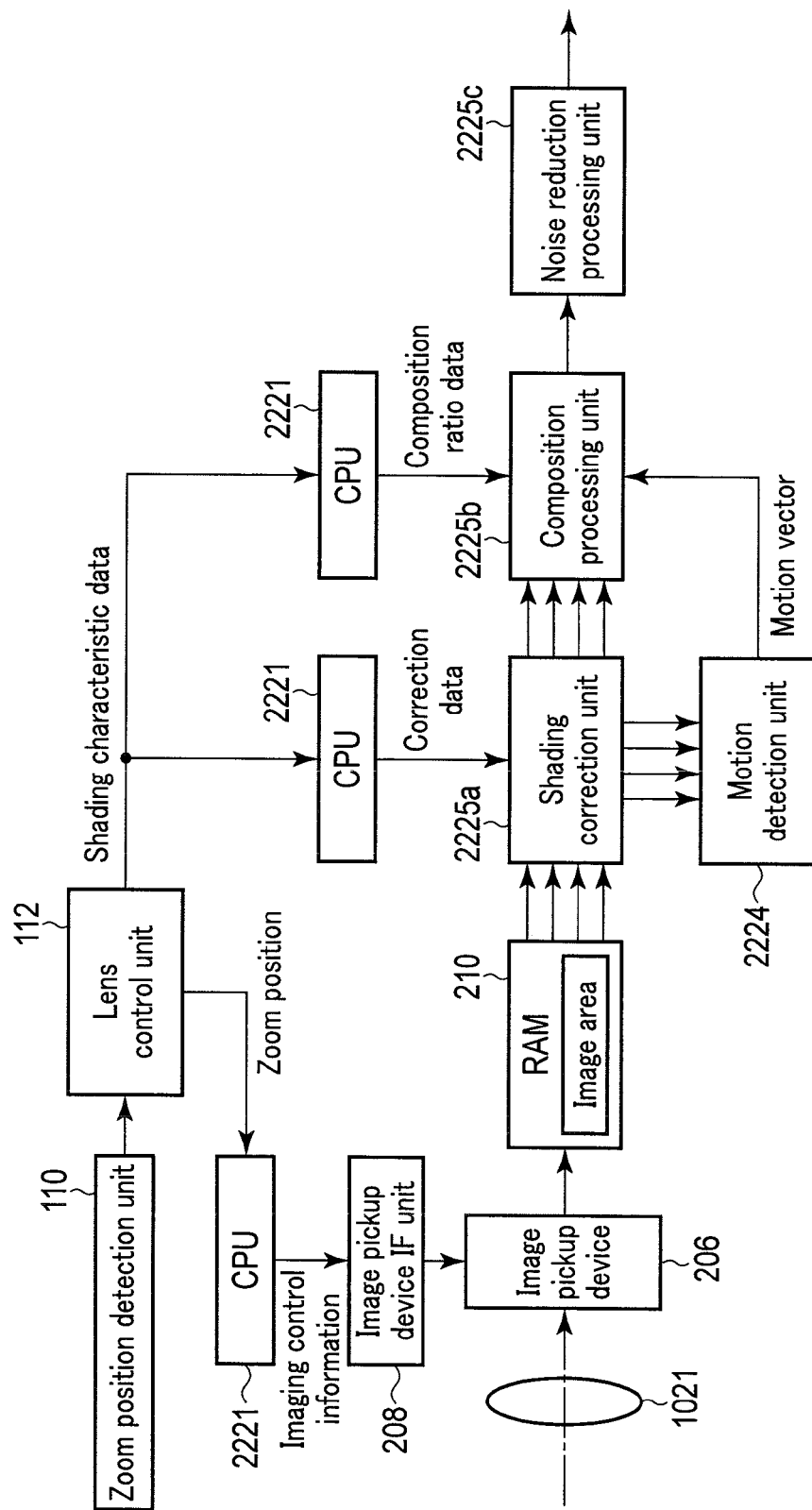
FIG. 3 is a functional block diagram showing the flow of data processing according to the first embodiment of the present invention.

FIG. 3 is a functional block diagram showing the flow of data processing according to the first embodiment of the present invention. In FIG. 3, parts that are particularly associated with the contents according to the present embodiment are extracted from the imaging system 1 shown in FIG. 1. A light flux from the subject that has entered via the photography lens 1021 is focused into an image on the imaging surface of the image pickup device 206. The CPU 2221 controls the image pickup device IF unit 208 to perform a photography operation by the image pickup device 206. Here, the focal distance (zoom position) of the photography lens 1021 during photography is detected in the zoom position detection unit 110. The lens control unit 112 acquires, from the lens data storage unit 1121, the shading characteristic data corresponding to the zoom position detected in the zoom position detection unit 110, and sends the acquired shading characteristic data to the CPU 2221 of the body control unit 222. The lens control unit 112 also sends the acquired focal distance (zoom position) of the photography lens 1021 to the CPU 2221 of the body control unit 222. The CPU 2221 changes the number of times of photography for single-frame photography in accordance with the focal distance. Details will be described later.

An image signal obtained as a result of the photography operation by the image pickup device 206 is read by the image pickup device IF unit 208 and then converted into image data which is a digital signal. This image data is stored in the image area of the RAM 210. Here, according to the present embodiment, the image data in multiple frames are used to correct the light amount decrease in the image data outside the image circle. More than once of photography are performed to obtain the image data in multiple frames. For example, in the example of FIG. 3, a maximum of four times of photography are performed so that the image data in four frames are stored in the image area of the RAM 210. Here, among the four times of photography in the example of FIG. 3, the initial first photography is the photography for a reference image, and the remaining three times of photography are photography for composition images. The number of times of photography is determined in accordance with the shading characteristics. Details of the processing for determining the number of times of photography will be described later.

In addition to the setting of the number of times of photography, the CPU 2221 inputs a shading correction factor (correction data) for the shading correction processing to the shading correction unit 2225a. The shading correction factor is determined from the light amount decrease in the pixel data around the image data for the pixel data in the center (corresponding to the center of the optical axis) of the image data. Further, the CPU 2221 calculates a composition ratio for the composition processing. The CPU 2221 then inputs a composition ratio to the composition processing unit 2225b. Here, the composition ratio is changed in accordance with image height positions.

The shading correction unit 2225a performs the shading correction processing for the image data read from the RAM 210 by use of the shading correction factor input from the CPU 2221. That is, the shading correction unit 2225a performs processing for multiplying each pixel data constituting the image data by the shading correction factor.

When the composition processing is needed, the motion detection unit 2224 detects, quadrant by quadrant, a motion vector between the image data in multiple frames which have been subjected to the shading correction processing. After aligning, quadrant by quadrant, the image data in multiple frames in accordance with the motion vector, the composition processing unit 2225b then composes the image data in multiple frames which have been subjected to the shading correction processing in accordance with the composition ratio input from the CPU 2221. The noise reduction processing unit 2225c then subjects the composed image data to the noise reduction processing. The image data which have been subjected to the noise reduction processing are used for display or used for recording.

FIG. 4 is a flowchart showing a detailed operation of the imaging system according to the first embodiment of the present invention. In FIG. 4, the CPU 2221 acquires information regarding the current focal distance (zoom position) of the photography lens 1021 detected in the zoom position detection unit 110 by communicating with the lens control unit 112 (step S101). The CPU 2221 then acquires lens data corresponding to the current zoom position, in particular, the shading characteristic data by communicating with the lens control unit 112 (step S102). The CPU 2221 then determines whether the current zoom position is equal to or more than a predetermined degree, that is, whether the focal distance has a length which is equal to or more than a predetermined length (step S103). The degree that is determined in step S103 to be equal to or more than the predetermined degree is a degree equal to more than a value at which, for example, the record image region in the image pickup device 206 becomes outside the image circle.

Figures 6A, 6B:
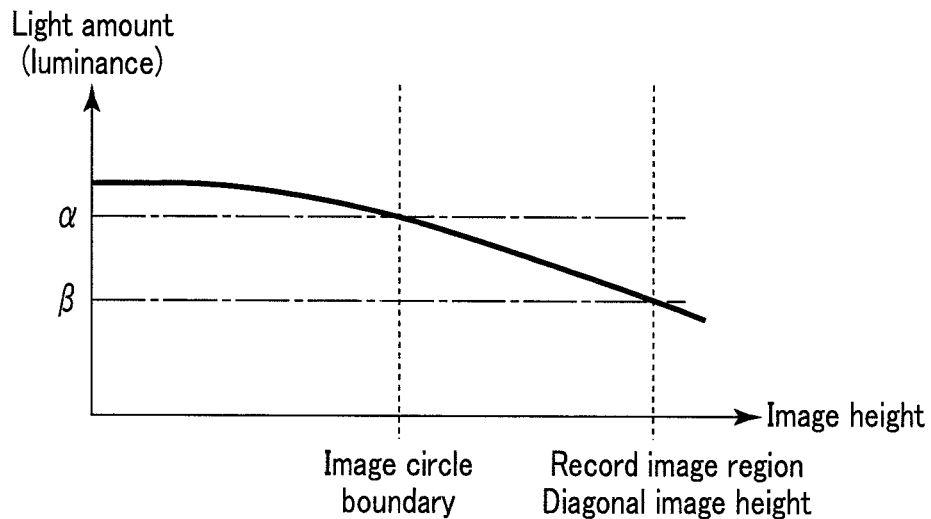
FIG. 6A is a graph showing an example of shading characteristic data.
FIG. 6B is a table showing the relation between image height positions and the composition ratios according to the first embodiment of the present invention.

When it is determined in step S103 that the current zoom position is equal to or more than the predetermined degree, the CPU 2221 sets the value of a photography count m in accordance with the shading characteristic information, and initializes the value of a parameter i indicating the number of times of photography to 1 (step S104). The setting of the number of times of photography is described here. As described above, the number of times of photography is determined in accordance with the shading characteristics. The shading characteristic data is data obtained by photographing a uniform luminance surface, and is, for example, data shown in FIG. 6A. The shading characteristic data shown in FIG. 6A is data in which the diagonal image height (the image height in a diagonal direction based on a position corresponding to the center of the optical axis) is taken on the horizontal axis and in which the light amount (the value of pixel data) is taken on the vertical axis. When there is a possibility that the record image region may become outside the image circle as in the present embodiment, the decrease of the light amount is extremely great outside the image circle. $\alpha/\beta$ indicates the difference of light amount decrease between the inside and outside of the image circle, wherein $\alpha$ is the light amount at the boundary of the image circle, and $\beta$ is the light amount at the end of the record image region. Here, in the case of the shading correction processing by a gain correction, the pixel data at the boundary of the image circle where the decrease of the light amount is small is corrected with low noise, whereas in the pixel data at the end of the record image region where the decrease of the light amount is great, noise is also amplified by the gain correction, and the S/N ratio also decreases. Thus, in the present embodiment, the shading correction processing and the composition processing are used together to inhibit the deterioration of the S/N ratio resulting from the shading correction processing in the pixel data in which the decrease of the light amount is great. Here, it is known that the degree of noise will be $1/\sqrt{m}$ if m image data obtained under the same exposure condition are composed. Therefore, the deterioration of the S/N ratio outside the image circle is inhibited by setting a photography count m in accordance with the degree of $\alpha/\beta$ as in FIG. 6B and composing the image data for the set photography count. In the example of FIG. 6B, the photography count is two when $1<\alpha/\beta\leq\sqrt{2}$ (where the noise is $1/\sqrt{2}$), the photography count is three when $\sqrt{2}<\alpha/\beta\leq\sqrt{3}$ (where the noise is $1/\sqrt{3}$), and the photography count is four when $\sqrt{3}<\alpha/\beta\leq2$ (where the noise is $\frac{1}{2}$).

After the photography count m is set to initialize the parameter i, the CPU 2221 uses the AF control unit 2222 to perform AF processing, and uses the AE control unit 2223 to perform AE processing (step S105). In the AF processing, the photography lens 1021 is driven so that the subject inside the image circle is focused. In the AE processing, the exposure condition is set so that the exposure of the subject inside the image circle will be proper. After the AF processing and the AE processing, the CPU 2221 controls the image pickup device IF unit 208 and the lens control unit 112 in accordance with the exposure condition determined as a result of the AE processing to perform the photography of the reference image (step S106). After the photography, the shading correction unit 2225a of the image processing unit 2225 performs the shading correction processing for the reference image data stored in the RAM 210 as the result of the photography (step S107). A shading correction factor $S0(z)$ is the function of an image height z indicating the shading characteristic data shown in FIG. 6A. Such a shading correction factor is multiplied by the pixel data to correct the light amount decrease in the pixel data in the vicinity of the image circle. However, outside the image circle, the light amount decrease is corrected, but noise considerably increases.

Figure 5:
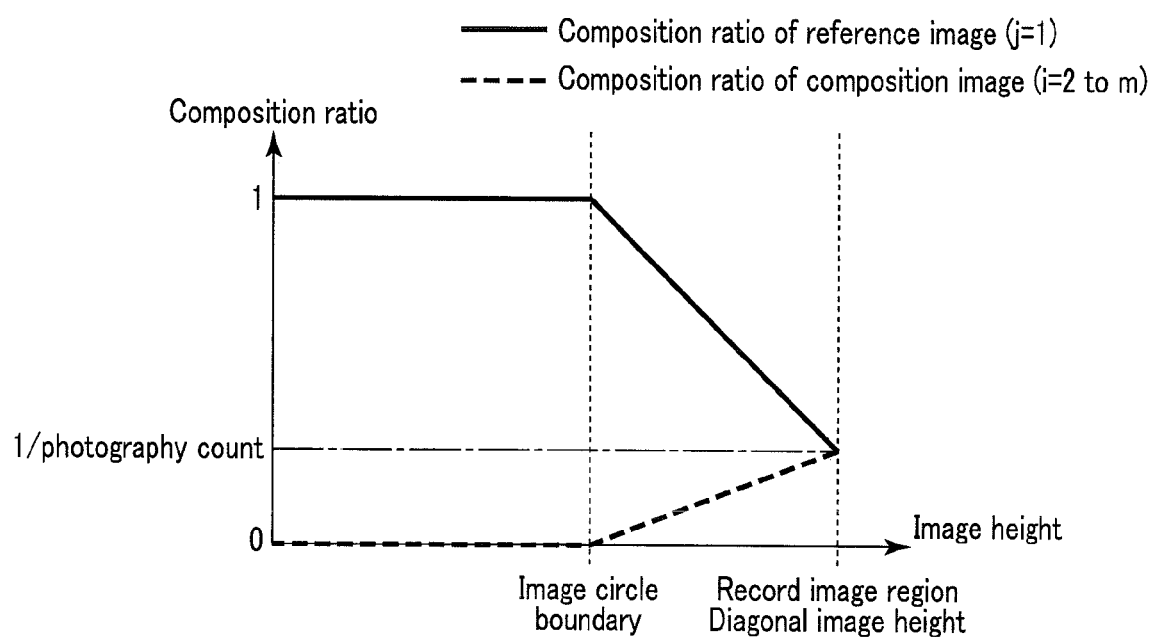
FIG. 5 is a graph illustrating the setting of the number of times of photography.

The CPU 2221 then calculates a composition ratio of the reference image data for the composition processing, and multiplies the calculated composition ratio by each of the pixel data constituting the reference image data (step S108). The calculation of the composition ratio is described here. FIG. 5 is a graph showing the relation between image height positions and the composition ratio. In the present embodiment, the composition ratio of the reference image data is set to 1 (the composition ratio of composition image data is set to 0) regardless of the image height positions inside the image circle. In contrast, outside the image circle, the composition ratio of the reference image data is decreased from 1 and the composition ratio of the composition image data is increased from 0 as the image height position becomes closer to the end position of the record image region. When the image height position has reached the end position of the record image region, the composition ratio of the reference image data and the composition ratio of the respective composition image data are set to 1/(photography count).

After the processing of the reference image, the CPU 2221 controls the image pickup device IF unit 208 and the lens control unit 112 in accordance with the exposure condition determined as a result of the AE processing to perform the photography of the composition image (step S109). After the photography, the shading correction unit 2225a of the image processing unit 2225 performs the shading correction processing for the composition image data stored in the RAM 210 as the result of the photography (step S110). That is, the shading correction unit 2225a performs processing for multiplying each pixel data constituting the composition image data by a predetermined gain value (shading correction factor). The shading correction factor by which the composition image data is multiplied is the shading correction factor $S0(z)$.

Figure 7:
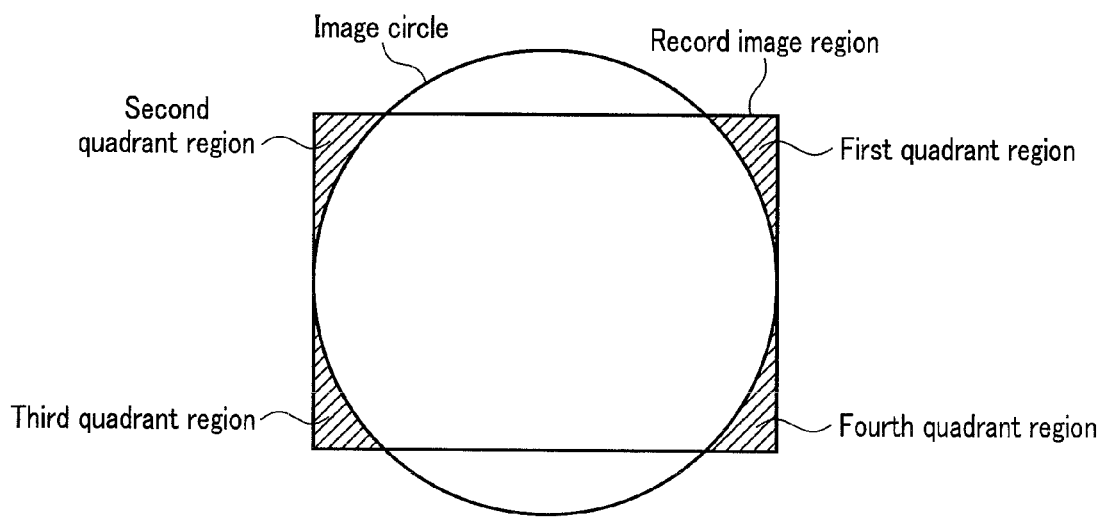
FIG. 7 is a diagram showing quadrants.

The motion detection unit 2224 then calculates a motion vector in the composition image data (step S111). Here, the motion vector is individually calculated quadrant by quadrant shown in FIG. 7. As described above, the upper right region from the original position is the first quadrant, the upper left region from the original position is the second quadrant, the lower left region from the original position is the third quadrant, and the lower right region from the original position is the fourth quadrant. After the motion vector is calculated, the CPU 2221 calculates a composition ratio of the composition image data (step S112). The composition processing unit 2225b then performs the composition processing (step S113). In the composition processing, the reference image data and each of the composition image data obtained by photography are composed in accordance with the composition ratio per image data. The composition processing is described below with reference to FIG. 8.

In FIG. 8, the composition processing unit 2225b initializes, to 0, a parameter j indicating the pixel position for the reference image data, that is, the pixel position which is targeted for the composition processing (step S201). The parameter j indicates the upper left pixel position in the image data, for example, at 0. Whenever the value of the parameter j increases, the pixel position is sequentially shifted in the rightward direction and the downward direction. The composition processing unit 2225b then determines whether the pixel position corresponding to the parameter j is the position outside the image circle (step S202). When it is determined in step S202 that the pixel position corresponding to the parameter j is not the position outside the image circle, the composition processing unit 2225b shifts the processing to step S208. When it is determined in step S202 that the pixel position corresponding to the parameter j is the position outside the image circle, the composition processing unit 2225b determines the quadrant to which the pixel position corresponding to the parameter j belongs (step S203). That is, the composition processing unit 2225b determines that the pixel position belongs to the first quadrant when the region to which the pixel position corresponding to the parameter j belongs is the upper right region. The composition processing unit 2225b determines that the pixel position belongs to the second quadrant when the region is the upper left region. The composition processing unit 2225b determines that the pixel position belongs to the third quadrant when the region is the lower left region. The composition processing unit 2225b determines that the pixel position belongs to the fourth quadrant when the region is the lower right region.

After the determination of the quadrant, the composition processing unit 2225b acquires a motion vector in the determined quadrant from the motion detection unit 2224 (step S204). The composition processing unit 2225b then acquires pixel data at the pixel position which is shifted by the motion vector from the pixel position corresponding to the parameter j in the composition image data (step S205). The composition processing unit 2225b then acquires a composition ratio of the composition image data at the pixel position corresponding to the parameter j, and multiplies the acquired composition ratio of the composition image data by the pixel data acquired in step S205 (step S206). The composition processing unit 2225b then adds up (composes) the pixel data corresponding to the parameter j in the reference image data and the pixel data in the corresponding composition image data (step S207).

After step S202 or step S207, the composition processing unit 2225b determines whether the processing for all the pixels is finished, that is, whether the parameter j has reached the value indicating the end of the record image region (step S208). When it is determined in step S208 that the processing for all the pixels is not finished, the composition processing unit 2225b increments the parameter j (step S209). The composition processing unit 2225b then returns the processing to step S202. In this case, the processing for the pixel data at the next pixel position is performed. When it is determined in step S208 that the processing for all the pixels is finished, the composition processing unit 2225b finishes the processing in FIG. 8.

Here, back to the explanation of FIG. 4, the CPU 2221 increments the parameter i after the composition processing for one composition image data (step S114). The CPU 2221 then determines whether i has become m (step S115). When it is determined in step S115 that i has not become m, the CPU 2221 returns the processing to step S109. In this case, the photography for the next composition image is performed. When it is determined in step S115 that i has become m, the CPU 2221 shifts the processing to step S119.

When it is determined in step S103 that the current zoom position is not equal to or more than the predetermined degree, the CPU 2221 uses the AF control unit 2222 to perform AF processing, and uses the AE control unit 2223 to perform AE processing (step S116).

After the AF processing and the AE processing, the CPU 2221 controls the image pickup device IF unit 208 and the lens control unit 112 in accordance with the exposure condition determined as a result of the AE processing to perform the photography of the image (step S117). The photography in step S117 is performed in the same manner as the photography for the reference image in step S106. After the photography, the shading correction unit 2225a of the image processing unit 2225 performs the shading correction processing for the reference image data stored in the RAM 210 as the result of the photography (step S118).

When the CPU 2221 determines in step S115 that the parameter i has become m or after step S118, the noise reduction processing unit 2225c of the image processing unit 2225 subjects the image data to the noise reduction processing (step S119). Here, the image processing ends with the noise reduction processing in the example of FIG. 4. However, other image processing such as a white balance correction may be performed before and after the noise reduction processing. After the image processing, the CPU 2221 displays the image on the display element 216 on the basis of the image data obtained by the image processing, or records the image in the recording medium 218 (step S120). The processing in FIG. 4 then ends.

As described above, according to the present embodiment, when the optical system 101 which has a possibility that the record image region may become outside the image circle due to the focal distance is used, image processing that differs between the inside and outside of the image circle is performed. That is, in the present embodiment, the composition processing of the image data in multiple frames is performed in accordance with the composition ratio corresponding to the image height. Thus, in the present embodiment, the composition processing corresponding to the image height is performed together with the shading correction processing, so that it is possible to inhibit the S/N ratio from deteriorating when the shading correction processing is performed by use of an extremely high shading correction factor outside the image circle. As a result, even if the optical system 101 which has a possibility that the record image region may become outside the image circle due to the focal distance is used, the difference of the S/N ratio between the inside and outside of the image circle can be reduced.

Furthermore, according to the present embodiment, alignment based on the motion vector is performed quadrant by quadrant to which the image data to be composed belongs.

The alignment is performed quadrant by quadrant so that the accuracy of alignment at the time of the composition processing can be improved.

Although the composition processing is performed after the shading correction processing here in the present embodiment, such composition processing may be performed, for example, after the distortion correction processing. In the distortion correction processing, noise outside the image circle increases as a result of the correction processing as in the shading correction processing, so that the technique according to the present embodiment is effective.

Second Embodiment

Figure 9:
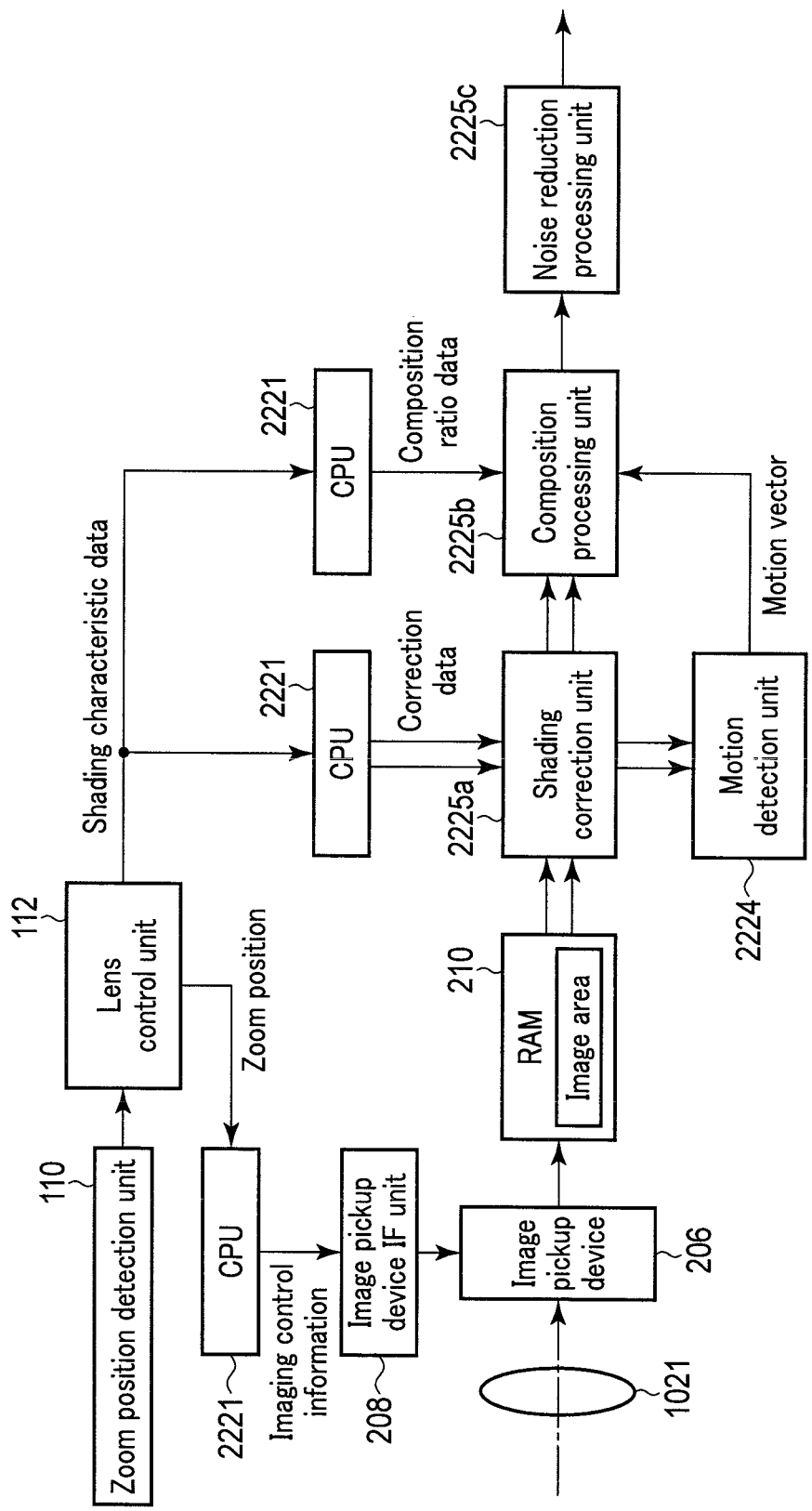
FIG. 9 is a functional block diagram showing the flow of data processing according to the second embodiment of the present invention.

Next, the second embodiment of the present invention is described. FIG. 9 is a functional block diagram showing the flow of data processing according to the second embodiment of the present invention. Here, reference numerals similar to those in FIG. 3 are assigned to blocks in FIG. 9 having functions corresponding to those in FIG. 3. Parts in FIG. 9 similar to those in FIG. 3 are not described. That is, the exposure condition and the shading correction factor are varied between the reference image data and the composition image data to reduce the number of times of photography for the composition image in the second embodiment, and the second embodiment is similar to the first embodiment in other respects.

Figure 10:
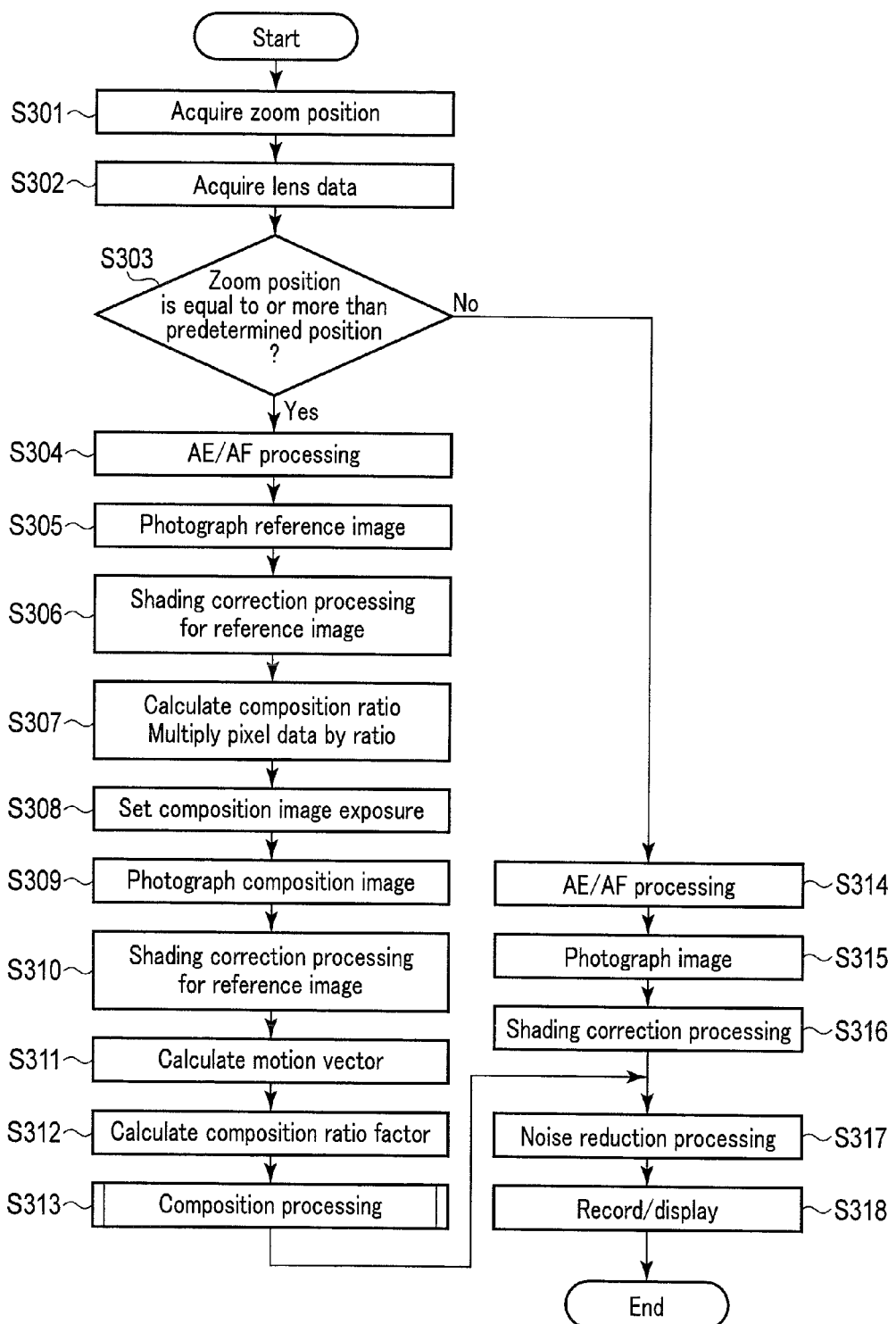
FIG. 10 is a flowchart showing a detailed operation of the imaging system according to the second embodiment of the present invention.

FIG. 10 is a flowchart showing a detailed operation of the imaging system according to the second embodiment of the present invention. Here, processes in FIG. 10 similar to those in FIG. 4 are not described. That is, processes in steps S301 to S306 and steps S311 to S318 in FIG. 10 are similar to processes in steps S101 to S103 and S105 to S107 and steps S111 to S120 in FIG. 4. In the second embodiment, the number of times of photography is fixed to 2, so that the process for determining the number of times photography in step S104 is omitted.

Figure 11:
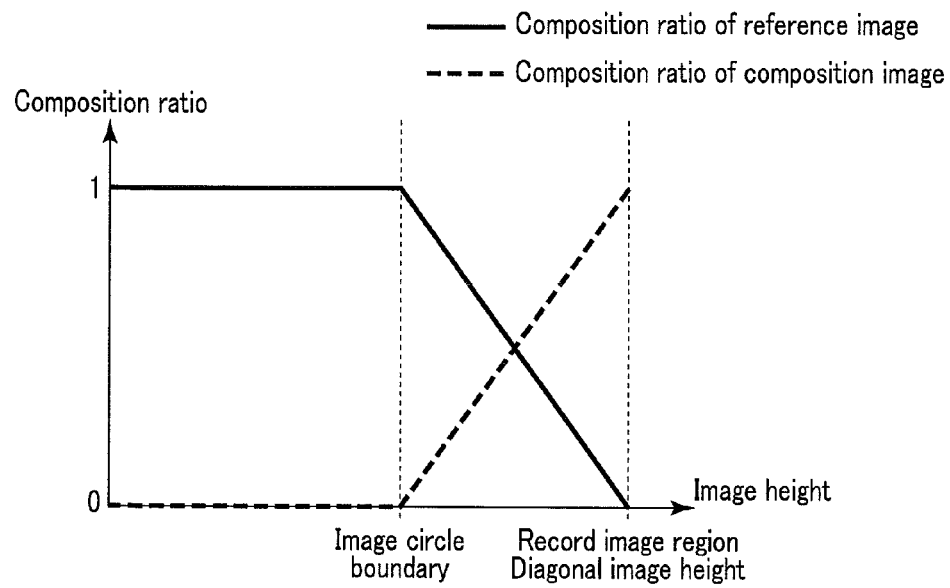
FIG. 11 is a graph showing the relation between image height positions and the composition ratios according to the second embodiment of the present invention.

After the shading correction processing for the reference image data, the CPU 2221 calculates a composition ratio of the reference image data for the composition processing, and multiplies the calculated composition ratio by each of the pixel data constituting the reference image data (step S307). The calculation of the composition ratio in the second embodiment is described here. FIG. 11 is a graph showing the relation between image height positions and the composition ratio according to the second embodiment. In the second embodiment, the composition ratio of the reference image data is set to 1 (the composition ratio of composition image data is set to 0) regardless of the image height positions inside the image circle. In contrast, outside the image circle, the composition ratio of the reference image data is decreased from 1 and the composition ratio of the composition image data is increased from 0 as the image height position becomes closer to the end position of the record image region. When the image height position has reached the end position of the record image region, the composition ratio of the reference image data is set to 0, and the composition ratio of the composition image data is set to 1.

Figure 12:
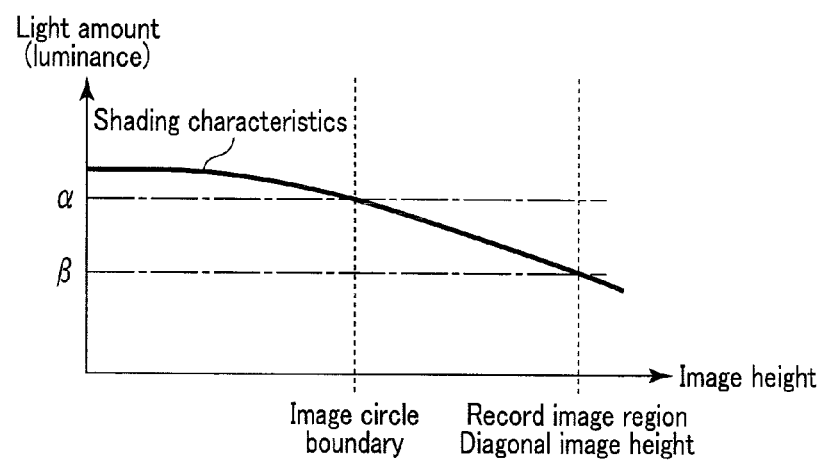
FIG. 12 is a graph showing an example of shading characteristic data.

After the processing of the reference image, the CPU 2221 sets the exposure condition for the composition image on the basis of the shading characteristic data the exposure condition for the reference image (step S308). The setting of the exposure condition for the composition image is described here. As shown in the shading characteristic data in FIG. 12 as well, the decrease of the light amount is extremely great outside the image circle. The S/N ratio deteriorates if the pixel data in which the decrease of the light amount is great is subjected to the shading correction processing by the gain correction. In the present embodiment, the shutter speed at the time of photography for the composition image is set slower before the composition processing of the reference image data and the composition image data to inhibit the decrease of the light amount outside the image circle. In the present embodiment, the deterioration of the S/N ratio outside the image circle is inhibited by such processing. When the shutter speed at the time of photography for the reference image calculated in step S304 is a, a shutter speed b at the time of photography for the composition image is provided, for example, as shown in (Equation 1) below.

$$b = a \times \alpha/\beta \quad \text{(Equation 1)}$$

After setting the exposure condition for the composition image, the CPU 2221 performs photography for the composition image in accordance with the exposure condition set in step S308 (step S309). After performing the photography, the CPU 2221 calculates a shading correction factor for the composition image (step S310). A shading correction factor $S1(z)$ for the composition image is provided, for example, as shown in (Equation 2) below.

$$S1(z) = S0(z) \times a/b \quad \text{(Equation 2)}$$

After the calculation of the shading correction factor, the shading correction unit 2225a of the image processing unit 2225 performs the shading correction processing for the composition image data stored in the RAM 210 as the result of the photography (step S310). The processing after the shading correction processing is similar to that in FIG. 4 and is therefore not described.

As described above, according to the present embodiment, the composition image data which is made brighter than the reference image data by the increase of the shutter speed is composed with the reference image data, so that the difference of the S/N ratio between the inside and outside of the image circle can be reduced by the small number of compositions, that is, the small number of times photography of as in the first embodiment.

Third Embodiment

Next, the third embodiment of the present invention is described. FIG. 13 is a functional block diagram showing the flow of data processing according to the third embodiment of the present invention. Here, reference numerals similar to those in FIG. 3 are assigned to blocks in FIG. 13 having functions corresponding to those in FIG. 3. Parts in the explanation in FIG. 13 similar to those in FIG. 3 are not described. In the third embodiment, once photography is performed, and image data is then stored in the RAM 210. This image data is subjected to the shading correction processing in the shading correction unit 2225a. The shading correction factor in the shading correction processing is similar to that in the first embodiment. The image data which has been subjected to the shading correction processing in the shading correction unit 2225a is input to a noise reduction processing unit 2225c1 and a noise reduction processing unit 2225c2. The photography operation according to the third embodiment of the present invention corresponds to that in the flowchart in FIG. 10 in which parts regarding the photography and correction of the composition image are eliminated. That is, this photography operation corresponds to that in the flowchart in FIG. 10 in which steps S307 to S312 are eliminated.

In the noise reduction processing unit 2225c1, noise reduction processing using, for example, coring processing is performed as in the first embodiment. The reference image data obtained by the noise reduction processing in the noise reduction processing unit 2225c1 is input to the composition processing unit 2225b.

In contrast, noise reduction processing different from that in the noise reduction processing unit 2225c1 is performed in the noise reduction processing unit 2225c2. Peripheral image data obtained by the noise reduction processing in the noise reduction processing unit 2225c2 is input to the composition processing unit 2225b. The noise reduction processing in the noise reduction processing unit 2225c is further described.

FIG. 14 is a diagram showing the configuration of the noise reduction processing unit 2225c2. As shown in FIG. 14, the noise reduction processing unit 2225c2 includes a similarity calculation unit 302 and a pixel value calculation unit 304. The similarity calculation unit 302 calculates a similarity between a target pixel block and a comparative pixel block set in the image data, and inputs the calculated similarity to the pixel value calculation unit 304 as a similarity weight. Here, the target pixel block is a block in a predetermined range (e.g. 3×3 pixels) around a target pixel which is sequentially set in the image data. The comparative pixel block is a block in the same range as the target pixel block around a comparative pixel which is sequentially set in a search region including the target pixel block. The pixel value calculation unit 304 searches the search region for a comparative pixel block having the greatest similarity weight to each target pixel block, performs a weighting addition of the pixel data regarding the target pixel in each target pixel block and the pixel data regarding the comparative pixel corresponding to the target pixel by using a comparative pixel weight set in each comparative pixel, and outputs the weighting addition result as pixel data regarding the final target pixel.

Here, in the noise reduction processing in the noise reduction processing unit 2225c2, the size of the search region and the comparative pixel weight are varied depending on whether the target pixel is inside or outside the image circle to reduce noise. FIG. 15A shows a search region and comparative pixel weights in the case in which the target pixel is inside the image circle. FIG. 15B shows a search region and comparative pixel weights in the case in which the target pixel is outside the image circle. Here, the numbers written in the search regions indicate comparative pixel weights.

As shown in FIG. 15A, when the target pixel is inside the image circle, the search region is only set in the peripheral part (e.g. 7×7 pixels around the target pixel) of the target pixel block. As shown in FIG. 15A, the comparative pixel weights are set to 1 in the whole search region inside the image circle. In this case, the pixel data regarding the final target pixel obtained by the weighting addition of the target pixel and the comparative pixels is the average pixel data of the target pixel and the comparative pixels.

As shown in FIG. 15B, when the target pixel is outside the image circle, the search region is set so that a range wider than that when the target pixel is inside the image circle, that is, the region inside the image circle is also included (e.g. 16×16 pixels). Moreover, as shown in FIG. 15B, the comparative pixel weights are set so that the comparative pixel weights increase in the order of the inside of the image circle, the boundary of the image circle, and the outside of the image circle. Therefore, in this case, the weights of the comparative pixels are higher when the comparative pixels corresponding to the target pixel are pixels inside the image circle. That is, in the pixel data regarding the final target pixel, components inside the image circle increase so that noise in the pixels outside the image circle which has increased due to the shading correction processing is reduced.

After the noise reduction processing in the noise reduction processing unit 2225c1 and the noise reduction processing unit 2225c2, the CPU 2221 inputs the composition ratios of the reference image data and the peripheral image data to the composition processing unit 2225b. The composition ratio is determined in accordance with the image height in the same manner as the composition ratio shown in FIG. 11. In the present embodiment, the composition ratio of the composition image data in FIG. 11 is treated as the composition ratio of the reference image data. In response to the input of the composition ratio, the composition processing unit 2225b composes the reference image data and the peripheral image data. The method of the composition processing may be similar to that described with reference to FIG. 8. However, this processing corresponds to a flowchart in which the following processes are eliminated from FIG. 8: the process for acquiring the motion vector in step S204, and the process for acquiring the image data in which the motion vector is shifted from composition pixels in step S205.

As described above, according to the present embodiment, two kinds of different noise reduction processing are performed for the image data which has been subjected to the shading correction processing, so that the difference of the S/N ratio between the inside and outside of the image circle can be reduced by once photography as in the first embodiment.

Here, in the third embodiment, the noise reduction processing unit 2225c1 performs the noise reduction processing by the coring processing. In contrast, the noise reduction processing unit 2225c1 may also perform the noise reduction processing similar to that in the noise reduction processing unit 2225c2.

Fourth Embodiment

Next, the fourth embodiment of the present invention is described. FIG. 16 is a functional block diagram showing the flow of data processing according to the fourth embodiment of the present invention. Here, reference numerals similar to those in FIG. 3 are assigned to blocks in FIG. 16 having functions corresponding to those in FIG. 3. Parts in the explanation in FIG. 16 similar to those in FIG. 3 are not described. In the fourth embodiment, once photography is performed, and image data is then stored in the RAM 210. This image data is subjected to the shading correction processing in the shading correction unit 2225a. The shading correction factor in the shading correction processing is similar to that in the first embodiment. The image data which has been subjected to the shading correction processing in the shading correction unit 2225a is input to a pixel addition unit 2225d. In the pixel addition unit 2225d, the S/N ratio outside the image circle is improved by pixel addition processing. The pixel addition processing is described below. The photography operation in the fourth embodiment corresponds to that in the flowchart in FIG. 10 in which parts regarding the photography and correction of the composition image are eliminated. That is, this photography operation corresponds to that in the flowchart in FIG. 10 in which steps S307 to S312 are eliminated. This photography operation also corresponds to that in the flowchart in FIG. 10 in which the composition processing in steps S313 is replaced by the pixel addition processing in FIG. 17 described later.

Figure 17:
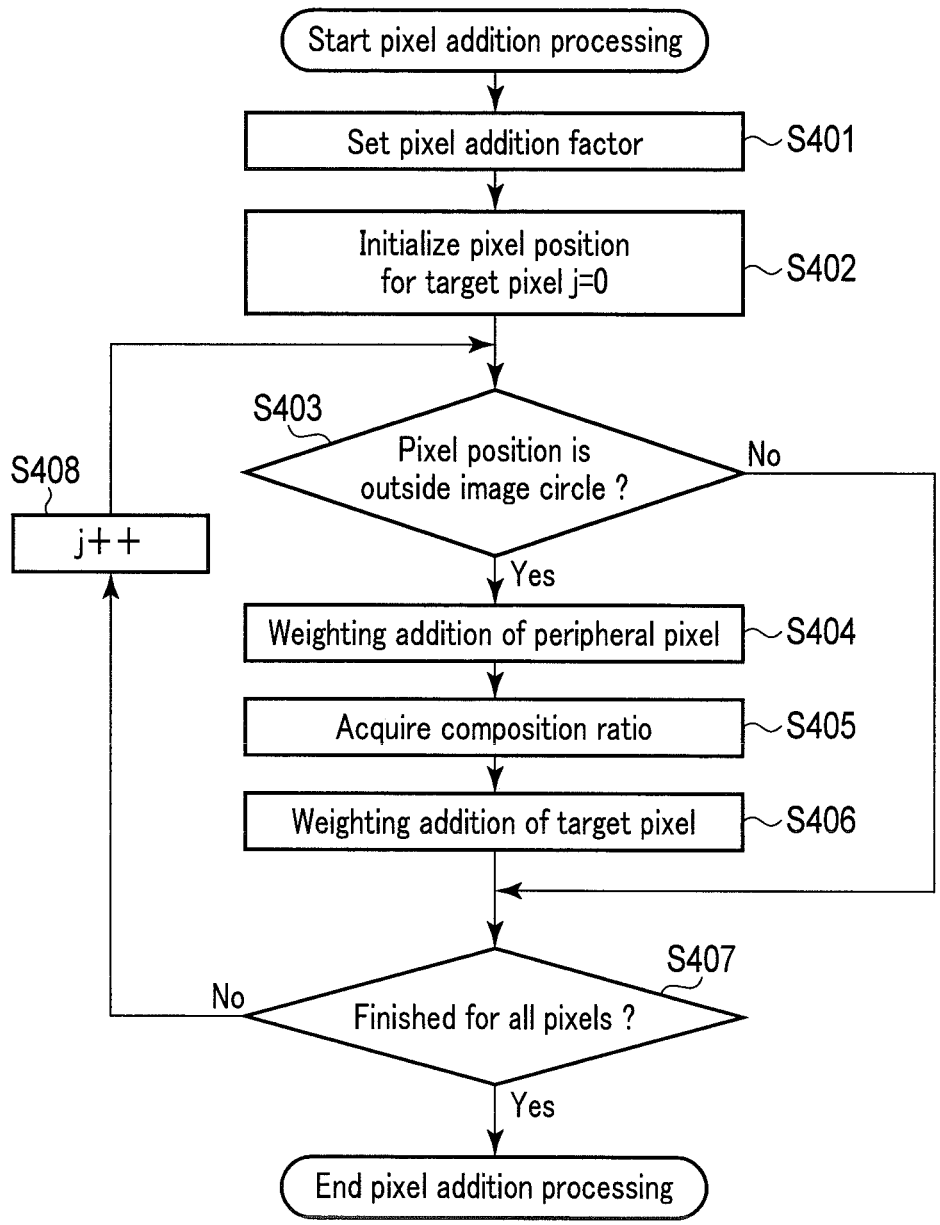
FIG. 17 is a flowchart showing pixel addition processing.
Figures 18A, 18B, 18C:
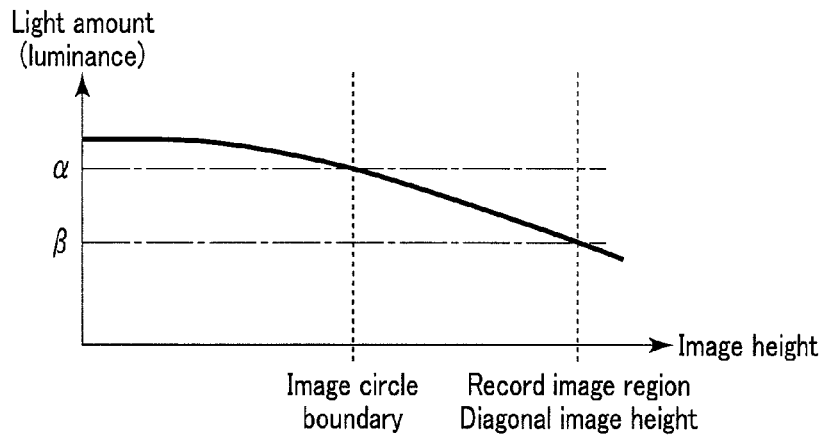
FIG. 18A is a graph showing an example of shading characteristic data.
FIG. 18B is a first diagram showing a setting example of a pixel addition factor according to the fourth embodiment.
FIG. 18C is a second diagram showing a setting example of a pixel addition factor according to the fourth embodiment.

FIG. 17 is a flowchart showing the pixel addition processing. In FIG. 17, the pixel addition unit 2225d sets a pixel addition factor (step S401). The setting of the pixel addition factor is described here. The pixel addition factor is determined in accordance with the shading characteristics. The shading characteristic data is, for example, data shown in FIG. 18A. In the present embodiment, the pixel addition factor is determined in accordance with the magnitude of $\alpha/\beta$, as in the first embodiment. For example, in the case of $1<\alpha/\beta\leq\sqrt{2}$ in which the deterioration of the S/N ratio is small, the pixel addition factor of the target pixel is set to be higher than the pixel addition factor of peripheral pixels. FIG. 18B shows an example in which each of the pixel addition factors of the target pixel and peripheral pixels is set so that the pixel addition factor of the target pixel: (the sum of the pixel addition factor of the peripheral pixels+the pixel addition factor of the target pixel) will be 1:4 when $1<\alpha/\beta\leq\sqrt{2}$. In the case of $\sqrt{2}<\alpha/\beta\leq2$ in which the deterioration of the S/N ratio is great, the pixel addition factor of the target pixel is set to be equal to the pixel addition factor of the peripheral pixels. FIG. 18C shows an example in which each of the weighting factors of the target pixel and peripheral pixels is set so that the pixel addition factor of the target pixel: (the sum of the pixel addition factors of the peripheral pixels+the weighting factor of the target pixel) will be 1:9. Here, FIG. 18B and FIG. 18C show setting examples of the pixel addition factors in the case of the addition of 9 pixels. The number of pixels to be added is not exclusively 9. For example, 25 pixels may be added.

After the setting of the pixel addition factors, the pixel addition unit 2225d initializes, to 0, the parameter j indicating the pixel position for the pixel data regarding the target pixel, that is, the pixel position which is targeted for the pixel addition processing (step S402). The parameter j indicates the upper left pixel position in the image data, for example, at 0. Whenever the value of the parameter j increases, the pixel position is sequentially shifted in the rightward direction and the downward direction. The pixel addition unit 2225d then determines whether the pixel position corresponding to the parameter j is the position outside the image circle (step S403). When it is determined in step S403 that the pixel position corresponding to the parameter j is not the position outside the image circle, the pixel addition unit 2225d shifts the processing to step S407. When it is determined in step S403 that the pixel position corresponding to the parameter j is the position outside the image circle, the pixel addition unit 2225d performs a weighting addition of the pixel data around the target pixel in accordance with the pixel addition factor set in step S401 (step S404). In the weighting addition here, the pixel data regarding the target pixel are actually also subjected to the weighting addition.

Figure 19:
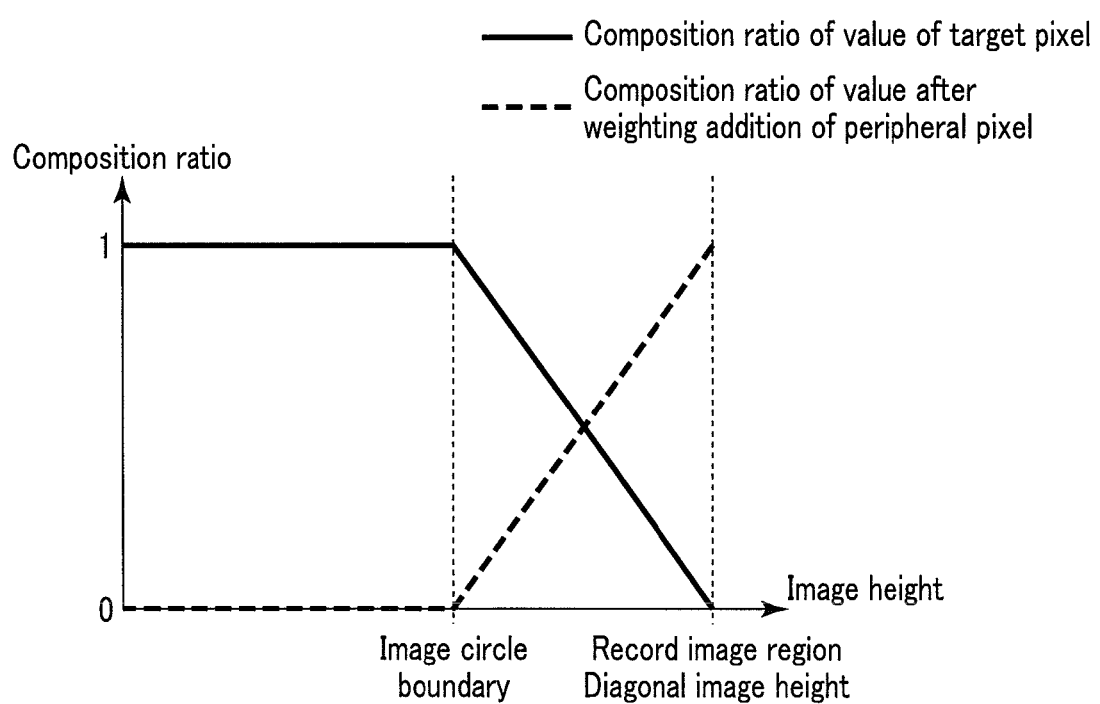
FIG. 19 is a graph showing the relation between image height positions and the composition ratios according to the fourth embodiment.

The pixel addition unit 2225d then acquires the composition ratio from the CPU 2221 (step S405). FIG. 19 is a graph showing the relation between image height positions and the composition ratio according to the fourth embodiment. In the fourth embodiment, the composition ratio of the pixel data regarding the target pixel is set to 1 (the composition ratio of the pixel data regarding the peripheral pixels which has been subjected to the weighting addition is set to 0) regardless of the image height positions inside the image circle. In contrast, outside the image circle, the composition ratio of the pixel data regarding the target pixel is decreased from 1 and the composition ratio of the pixel data regarding the peripheral pixels which has been subjected to the weighting addition is increased from 0 as the image height position becomes closer to the end position of the record image region. When the image height position has reached the end position of the record image region, the composition ratio of the pixel data regarding the target pixel is set to 0, and the composition ratio of the pixel data regarding the peripheral pixels which has been subjected to the weighting addition is set to 1. After the acquisition of such a composition ratio, the pixel addition unit 2225d performs a weighting addition of the pixel data regarding the peripheral pixels which has been subjected to the weighting addition and the pixel data regarding the target pixel in accordance with the composition ratio (step S406).

After step S403 or step S406, the pixel addition unit 2225d determines whether the processing for all the pixels is finished, that is, whether the parameter j has reached the value indicating the end of the record image region (step S407). When it is determined in step S407 that the processing for all the pixels is not finished, the pixel addition unit 2225d increments the parameter j (step S408). The pixel addition unit 2225d then returns the processing to step S403. In this case, the processing for the pixel data at the next pixel position is performed. When it is determined in step S407 that the processing for all the pixels is finished, the pixel addition unit 2225d finishes the processing in FIG. 17. Processes similar to those in steps S119 and S120 in FIG. 4 are performed.

As described above, according to the present embodiment, the noise reduction processing is performed after the difference of the S/N ratio between the inside and outside of the image circle is reduced by the pixel addition, so that the difference of the S/N ratio between the inside and outside of the image circle can be reduced by once photography as in the third embodiment.

While the present invention has been described above in connection with the embodiments, it should be understood that the present invention is not limited to the embodiments described above, and various modifications and applications can be made within the scope of the present invention. For example, in the examples shown in the embodiments described above, the interchangeable lens 100 and the imaging apparatus 200 are separate. In contrast, each component of the interchangeable lens 100 may be incorporated in the imaging apparatus 200.

Each of the processes according to the embodiments described above can be stored as a program that can be executed by the CPU 2221. This program can be stored and distributed in a storage medium of an external storage device such as a memory card (e.g. a ROM card, a RAM card), a magnetic disk (e.g. hard disk), an optical disk (a CD-ROM, a DVD), or a semiconductor memory. The CPU 2221 then reads the program stored in the storage medium of the external storage device, and the operation is controlled by the read program, so that the processing described above can be performed.

What is claimed is:
1. An imaging apparatus comprising:
  an optical system which is variable in focal distance and which varies a size of an image circle by the focal distance, the image circle being an effective image formation region of an optical image of a subject;
  a data storage unit which stores data indicating a correspondence between a value of the focal distance and a value of the size of the image circle;
  an imaging unit which obtains image data from the optical image formed on an image pickup device via the optical system; and an image processing unit which performs image processing for image data corresponding to an outside of the image circle among image data obtained in the imaging unit on the basis of the data indicating the correspondence, wherein as the image processing for the image data corresponding to the outside of the image circle, the image processing unit performs composition processing of image data in multiple frames after dividing each of the image data in multiple frames corresponding to the outside of the image circle into quadrant-by-quadrant regions and aligning the divided image data in multiple frames quadrant by quadrant, and wherein the image processing unit searches a search region in the image data for a comparative pixel block which is highly similar to a target pixel block around a target pixel in the image data, performs, as the image processing, processing of a weighting addition of the target pixel and a comparative pixel in a center of a comparative pixel block that has been searched for, and varies a comparison weight of the pixel included in the comparative pixel block depending on whether the target pixel included in the comparative pixel block is a pixel inside the image circle or a pixel outside the image circle.

2. The imaging apparatus according to claim 1, wherein the image processing unit changes a composition ratio of the image data in the composition processing in accordance with an image height.

3. The imaging apparatus according to claim 1, wherein the imaging unit acquires the image data in at least one of the frames by acquiring the image data with the image pickup device at a shutter speed lower than a shutter speed at which an exposure of the subject inside the image circle is proper.

4. The imaging apparatus according to claim 1, wherein the image processing unit increases the comparison weight of the pixel included in the comparative pixel block in the order of the inside of the image circle, the boundary of the image circle, and the outside of the image circle.

5. An imaging system comprising:
   an interchangeable lens comprising
      an optical system which is variable in focal distance and which varies a size of an image circle by the focal distance, the image circle being an effective image formation region of an optical image of a subject,
      a lens data storage unit which stores data indicating a correspondence between a value of the focal distance and a value of the size of the image circle, and
      a lens interface unit which sends data indicating the correspondence; and
   an imaging apparatus comprising
      an imaging unit which obtains image data from the optical image formed on an image pickup device via the optical system,
      an apparatus interface unit which receives the data indicating the correspondence from the lens interface unit, and
      an image processing unit which performs image processing for image data corresponding to an outside of the image circle among image data obtained in the imaging unit on the basis of the data indicating the correspondence received in the apparatus interface unit,
   wherein as the image processing for the image data corresponding to the outside of the image circle, the image processing unit performs composition processing of image data in multiple frames after dividing each of the image data in multiple frames corresponding to the outside of the image circle into quadrant-by-quadrant regions and aligning the divided image data in multiple frames quadrant by quadrant, and wherein the image processing unit searches a search region in the image data for a comparative pixel block which is highly similar to a target pixel block around a target pixel in the image data, performs, as the image processing, processing of a weighting addition of the target pixel and a comparative pixel in a center of a comparative pixel block that has been searched for, and varies the comparison weight of the pixel included in the comparative pixel block depending on whether the pixel is included in the comparative pixel block and is inside the image circle or the pixel is included in the comparative pixel block is outside the image circle.

6. The imaging system according to claim 5, wherein the image processing unit changes a composition ratio of the image data in the composition processing in accordance with an image height.

7. The imaging system according to claim 5, wherein the imaging unit acquires the image data in at least one of the frames by acquiring the image data with the image pickup device at a shutter speed lower than a shutter speed at which an exposure of the subject inside the image circle is proper.

8. The imaging system according to claim 5, wherein the image processing unit increases the weighting factor of the comparative pixel in the order of the inside of the image circle, the boundary of the image circle, and the outside of the image circle when the target pixel is the pixel outside the image circle.

9. An image processing method comprising:
   obtaining image data from an optical image formed in an imaging unit via an optical system, the optical system being variable in focal distance and varying a size of an image circle by the focal distance, the image circle being an effective image formation region of the optical image of a subject; and
   performing image processing for image data corresponding to an outside of the image circle among image data obtained in the imaging unit on the basis of the data indicating a correspondence between a value of the focal distance and a value of a size of the image circle,
   wherein the image processing for the image data corresponding to the outside of the image circle comprises performing composition processing of image data in multiple frames, the composition processing being performed after dividing each of the image data in multiple frames corresponding to the outside of the image circle into quadrant-by-quadrant regions and aligning the divided image data in multiple frames quadrant by quadrant,
   wherein the image processing comprises searching a search region in the image data for a comparative pixel block which is highly similar to a target pixel block around a target pixel in the image data, performing a weighting addition of the target pixel and a comparative pixel in a center of a comparative pixel block that has been searched for, and
   wherein the image processing further comprises varying a comparison weight of the pixel included in the comparative pixel block depending on whether the pixel is included in the comparative pixel block and is inside the image circle or the pixel is included in the comparative pixel block and is outside the image circle.

10. The image processing method according to claim 9, wherein the composition processing comprises changing a composition ratio of the image data in accordance with an image height.

11. The image processing method according to claim 9, wherein the imaging unit acquires the image data in at least one of the frames by acquiring the image data with the image pickup device at a shutter speed lower than a shutter speed at which an exposure of the subject inside the image circle is proper.

12. The image processing method according to claim 9, wherein varying the weighting factor comprises increasing the comparison of the pixel included in the comparative pixel block in the order of the inside of the image circle, the boundary of the image circle, and the outside of the image circle.

* * * * *